(12) United States Patent
Grimm

(10) Patent No.: US 12,459,062 B1
(45) Date of Patent: Nov. 4, 2025

(54) HELICAL COOLANT CHANNELS IN CUTTING TOOLS

(71) Applicant: KENNAMETAL INC., Latrobe, PA (US)

(72) Inventor: Tyler Grimm, Latrobe, PA (US)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 19/021,546

(22) Filed: Jan. 15, 2025

(51) Int. Cl.
| | |
|---|---|
| B23P 15/34 | (2006.01) |
| B23C 5/10 | (2006.01) |
| B23C 5/28 | (2006.01) |
| B23B 51/04 | (2006.01) |
| B23B 51/06 | (2006.01) |
| B23C 5/00 | (2006.01) |
| B23P 15/28 | (2006.01) |

(52) U.S. Cl.
CPC ............... B23P 15/34 (2013.01); B23C 5/10 (2013.01); B23C 5/282 (2022.02); B23C 5/283 (2022.02); *B23B 51/042* (2013.01); *B23B 51/0686* (2022.01); *B23C 5/006* (2013.01); *B23C 2210/40* (2013.01); *B23C 2210/486* (2013.01); *B23C 2250/12* (2013.01); *B23P 15/28* (2013.01); *Y10T 29/49995* (2015.01); *Y10T 29/49996* (2015.01)

(58) Field of Classification Search
CPC .... B23P 15/28; B23P 15/34; Y10T 29/49995; Y10T 29/49996; B23C 5/006; B23C 5/10; B23C 5/282; B23C 2210/40; B23C 2210/486; B23C 2250/012; B23B 51/042; B23B 51/0686
See application file for complete search history.

(56) References Cited

U.S. PATENT DOCUMENTS

| | | | |
|---|---|---|---|
| 4,302,135 A | 11/1981 | Lillie | |
| 5,094,573 A * | 3/1992 | Hougen | B23C 5/10 |
| | | | 407/53 |
| 9,227,253 B1 * | 1/2016 | Swift | B23C 5/28 |
| 10,010,948 B1 | 7/2018 | Hayden et al. | |
| 10,814,406 B1 * | 10/2020 | Wang | B23C 5/28 |

(Continued)

FOREIGN PATENT DOCUMENTS

| | | | | |
|---|---|---|---|---|
| EP | 3533545 A1 * | 9/2019 | | B23C 5/28 |
| EP | 3819056 A1 * | 5/2021 | | B23C 5/10 |

(Continued)

*Primary Examiner* — Jermie E Cozart
(74) *Attorney, Agent, or Firm* — John A. Wilaj, Jr.

(57) ABSTRACT

A body of a cutting tool may include a shank and a tip having spaced-apart, helical flutes. Each spaced-apart, helical flute may include a helical cutting edge extending from a tip bottom, adjacent a shank top, to a tip top. The tip may include chip gash paths. Each chip gash path may be recessed between two of the spaced-apart, helical flutes, and extend from the tip bottom to a tip top portion. The body may include helical coolant channels extending from entrances at a shank bottom, to within a shank interior, to within a tip interior, to tip coolant orifice exits. The coolant orifice exits may be disposed in the spaced-apart, helical flutes adjacent the chip gash paths or disposed in relief surfaces extending from the tip top downward to the chip gash paths. The coolant orifice exits may be spaced-apart from the tip top.

20 Claims, 17 Drawing Sheets

(56) References Cited

U.S. PATENT DOCUMENTS

| | | |
|---|---|---|
| 2005/0214082 A1 | 9/2005 | Dasch |
| 2006/0067797 A1* | 3/2006 | Calamia .................... B23C 5/10 407/53 |
| 2006/0204345 A1 | 9/2006 | Borschert et al. |
| 2010/0272531 A1 | 10/2010 | Shavit |
| 2013/0136550 A1 | 5/2013 | Kakai et al. |
| 2015/0367429 A1* | 12/2015 | Pearce ...................... B23C 5/10 407/11 |
| 2019/0134723 A1 | 5/2019 | Mueller et al. |
| 2020/0353545 A1* | 11/2020 | Hurtubise .......... B23Q 11/1061 |
| 2021/0053128 A1* | 2/2021 | Filho ...................... B23B 51/02 |
| 2021/0138561 A1 | 5/2021 | Sterling |
| 2022/0203464 A1 | 6/2022 | Pittala |
| 2023/0364689 A1* | 11/2023 | Kawashima ........ B23B 51/0003 |

FOREIGN PATENT DOCUMENTS

| | | | |
|---|---|---|---|
| JP | 2012200836 A | * | 10/2012 |
| WO | WO2017197419 A1 | | 11/2017 |

* cited by examiner

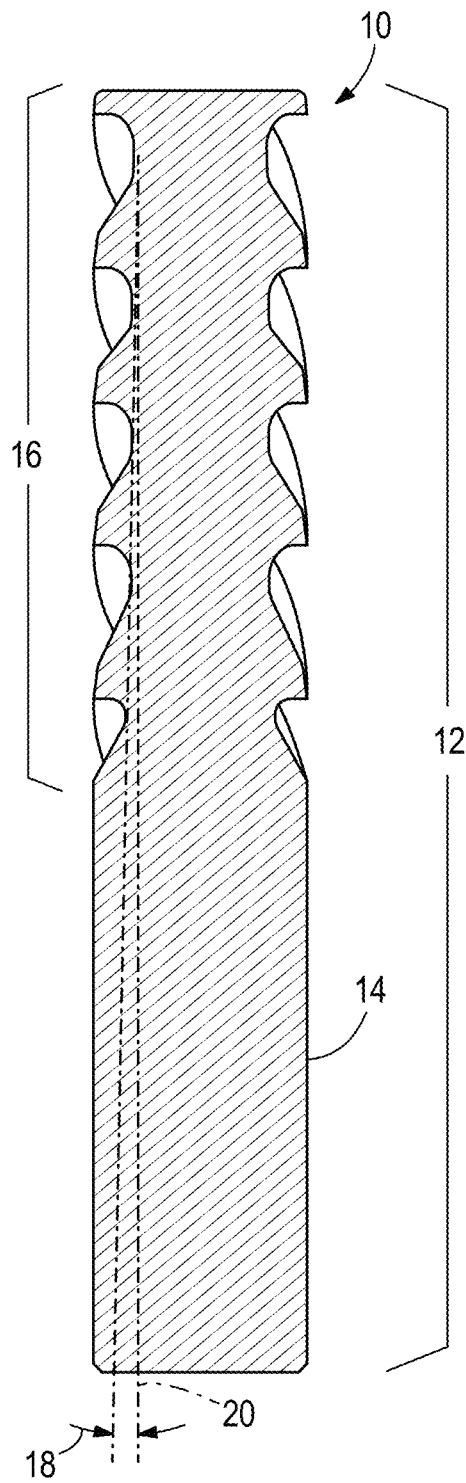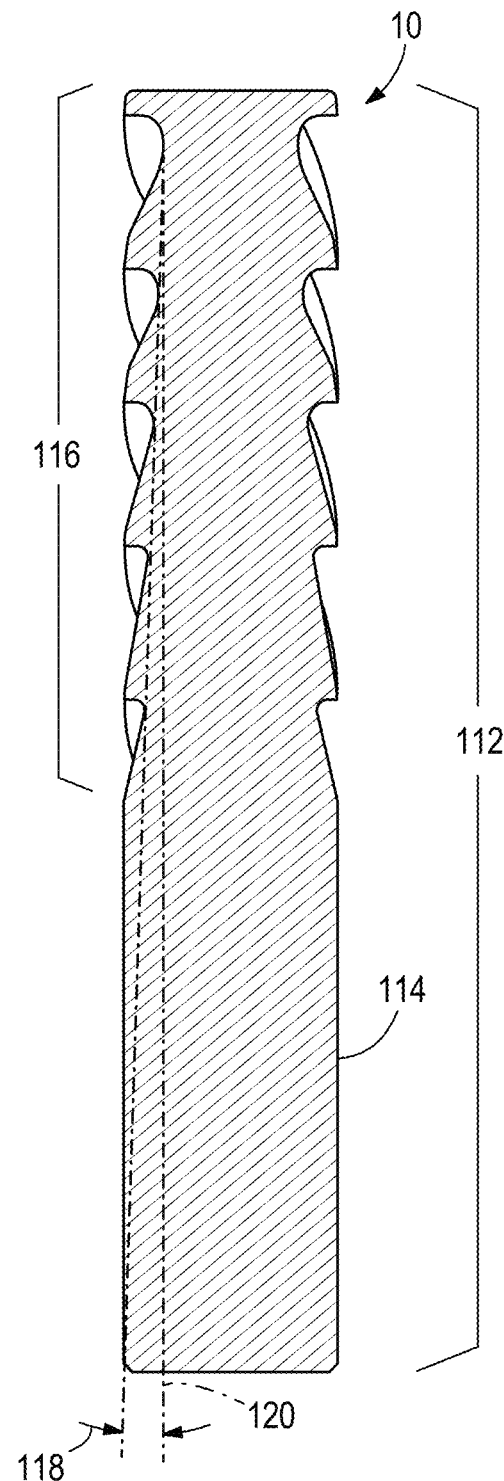

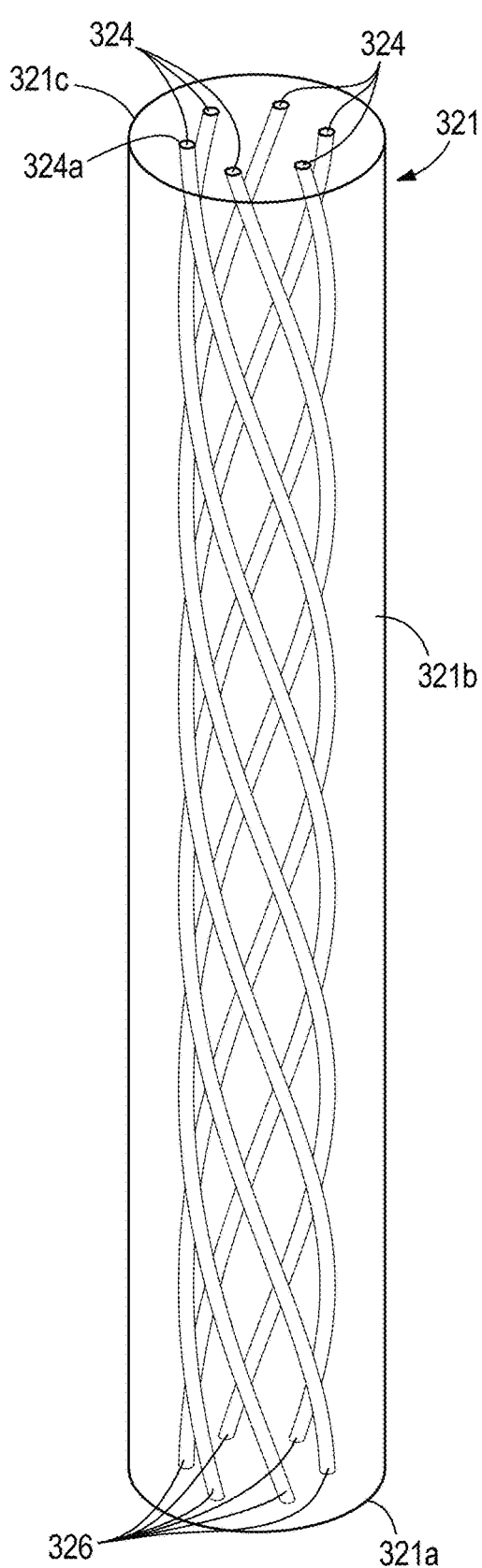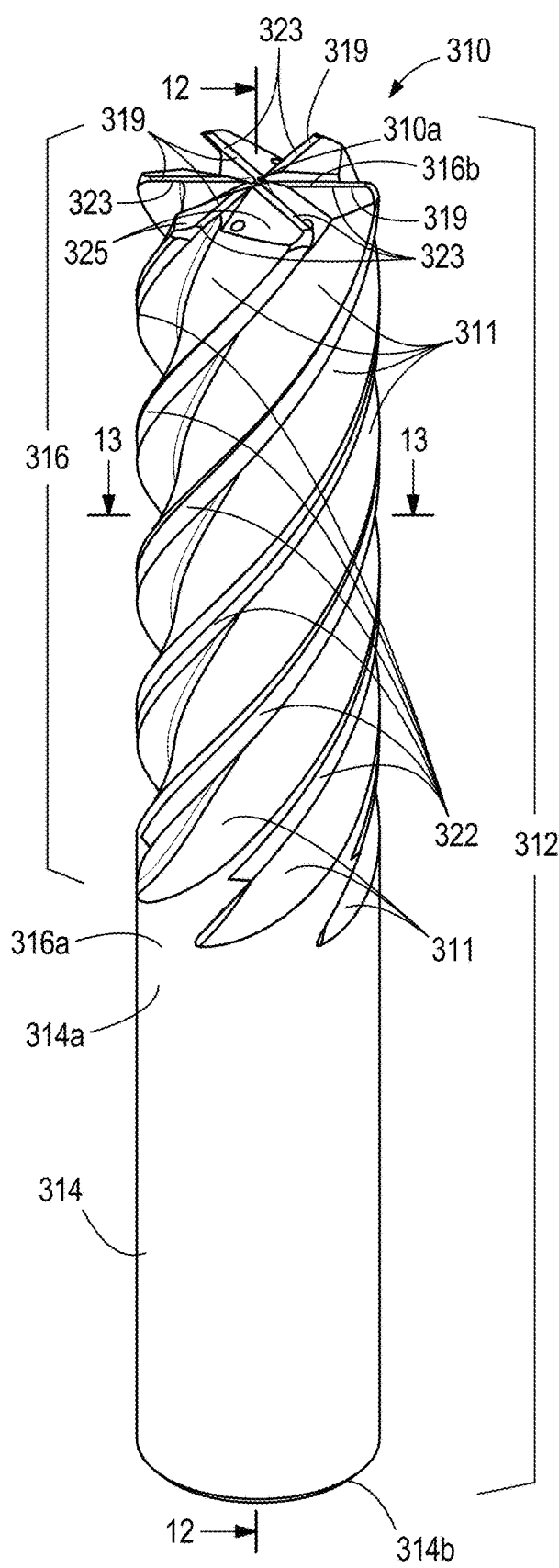
FIG. 10                    FIG. 11

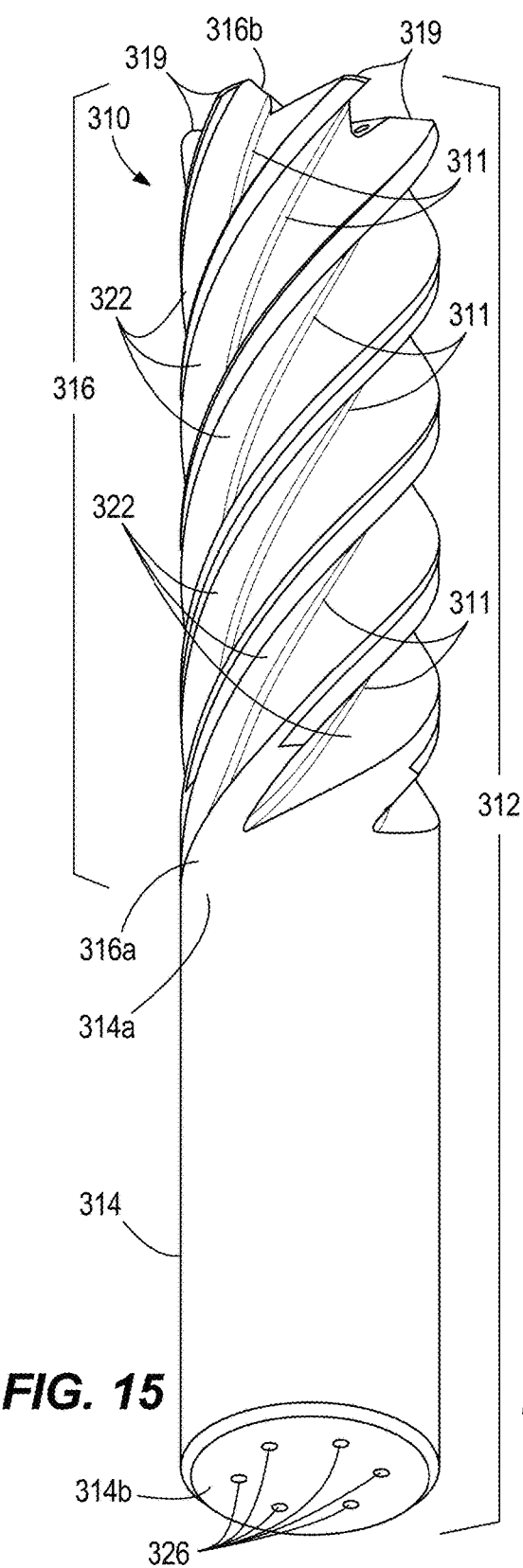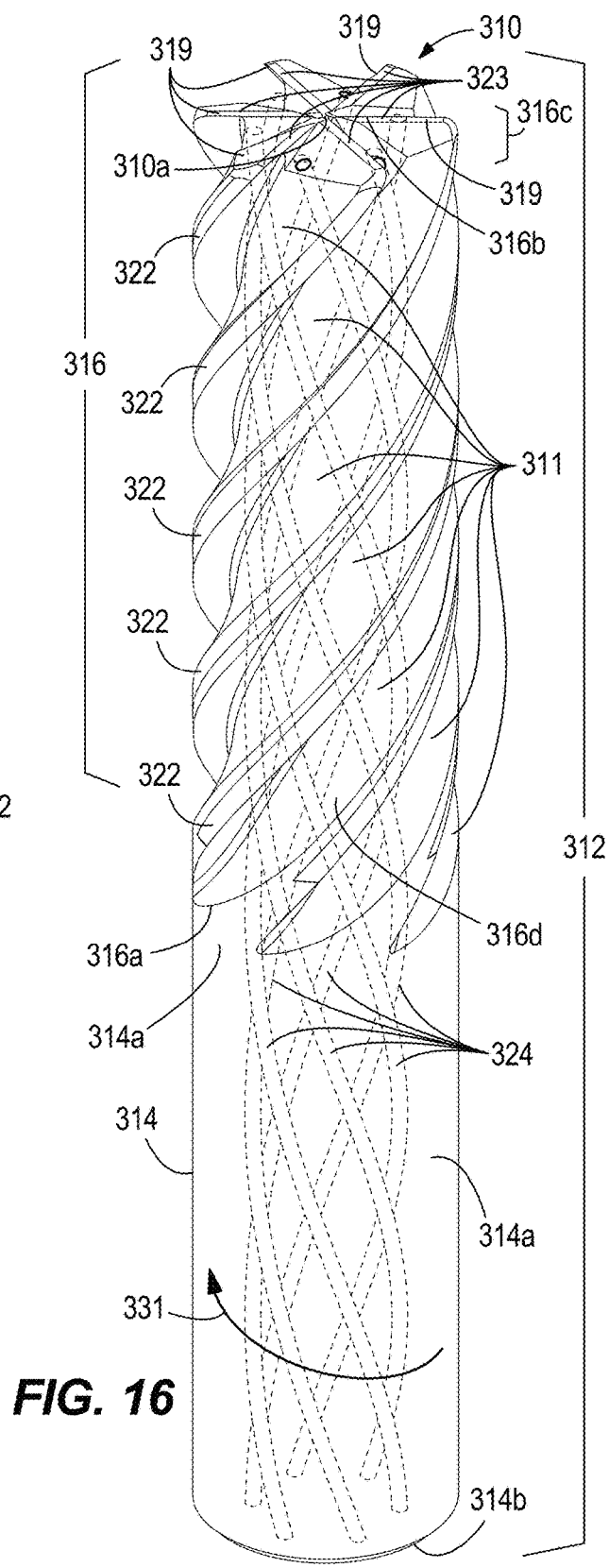

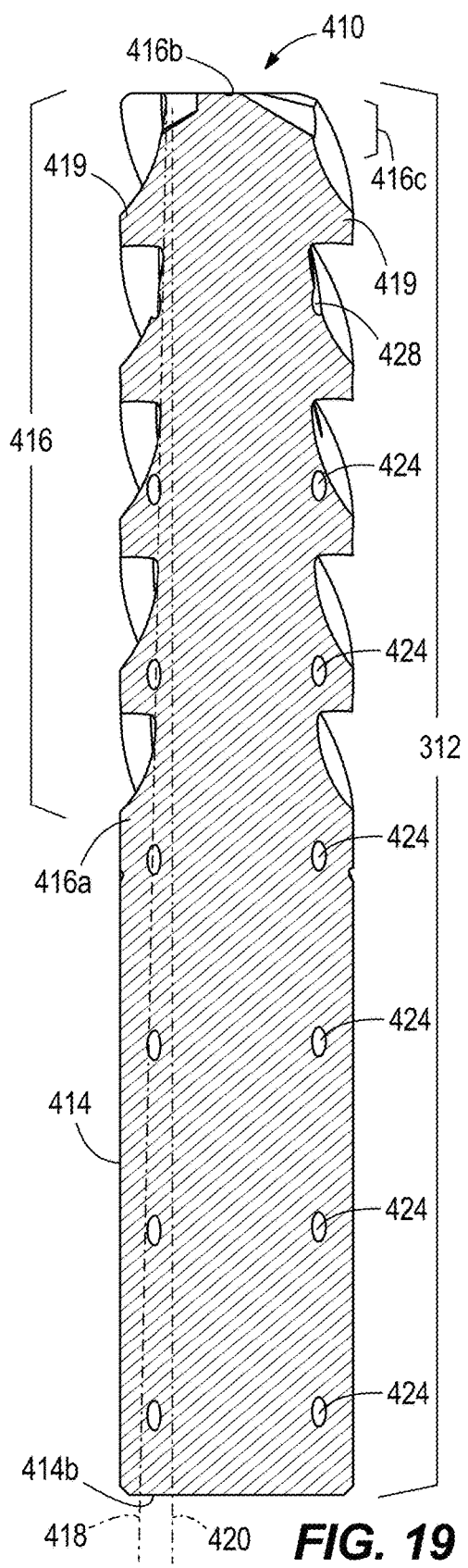
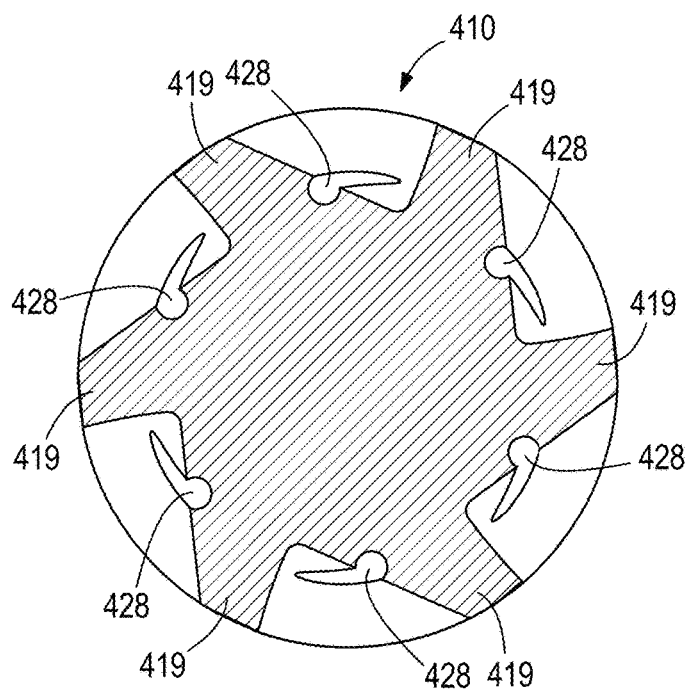
FIG. 20
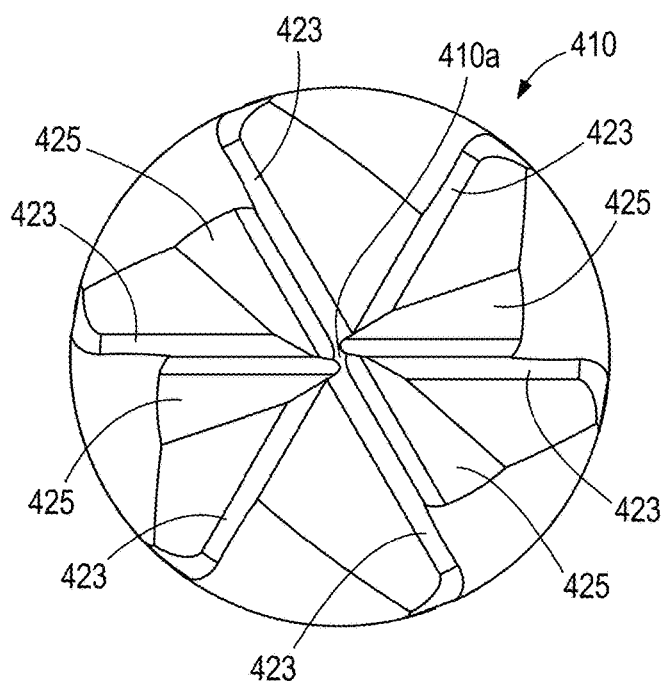
FIG. 21
FIG. 19

HELICAL COOLANT CHANNELS IN CUTTING TOOLS

FIELD OF THE DISCLOSURE

The disclosure generally relates to cutting tools having helical coolant channels.

BACKGROUND

Cutting tools, such as end mills, may generate substantial heat during the machining of workpieces. This may result in tremendous stress being placed on the cutting tool leading to pre-mature damage and subsequent costly replacement. Coolant channels in cutting tools may be utilized to flow coolant towards high-stress locations in the cutting tools to reduce the heat and stress being placed on the cutting tools. Typically, coolant channels are electric-discharge machined, green-machined, or 3D printed. Each of these manufacturing processes may add time and cost to the manufacturing process of the cutting tools. These manufacturing process may also produce an inferior substrate to extruded blanks.

A cutting tool, and method of its manufacture, is needed to reduce one or more issues associated with one or more of the current cutting tools.

SUMMARY

In one embodiment of the disclosure, a cutting tool may be disclosed. The cutting tool may include a body comprising a shank and a tip. The tip may comprise a plurality of spaced-apart, helical flutes. Each of the plurality of spaced-apart, helical flutes may comprise a helical cutting edge extending from a bottom of the tip, adjacent a top of the shank, to a top of the tip. The tip may comprise a plurality of chip gash paths. Each of the plurality of chip gash paths may be recessed between two of the respective plurality of spaced-apart, helical flutes, and may extend from the bottom of the tip to a top portion of the tip. The body may further comprise a plurality of helical coolant channels extending from entrances at a bottom of the shank, to within an interior of the shank, to within an interior of the tip, to coolant orifice exits in the tip. The coolant orifice exits may be disposed in the plurality of spaced-apart, helical flutes adjacent the plurality of chip gash paths or disposed in a plurality of relief surfaces extending from the top of the tip downward to the plurality of chip gash paths. The coolant orifice exits may be spaced-apart from the top of the tip.

In another embodiment of the disclosure, a method of manufacturing a cutting tool may be disclosed. One step may comprise forming a blank to have a plurality of helical coolant channels extending from entrances at or near a bottom of the blank, to within an interior of the blank, to or near a top of the blank. Another step may comprise grinding the blank to form a body. The body may include a shank and a tip. The tip may comprise a plurality of spaced-apart, helical flutes. Each of the plurality of spaced-apart, helical flutes may comprise a helical cutting edge extending from a bottom of the tip, adjacent a top of the shank, to a top of the tip. The tip may further comprise a plurality of chip gash paths. Each of the plurality of chip gash paths may be recessed between two of the respective plurality of spaced-apart, helical flutes, and may extend from the bottom of the tip to a top portion of the tip. The tip may further comprise coolant orifice exits. The plurality of helical coolant channels may extend from the entrances at a bottom of the shank, to within an interior of the shank, to within an interior of the tip, to the coolant orifice exits of the tip. The coolant orifice exits may be disposed in the plurality of spaced-apart, helical flutes adjacent the plurality of chip gash paths or disposed in a plurality of relief surfaces extending from the top of the tip downward to the plurality of chip gash paths. The coolant orifice exits may be spaced-apart from the top of the tip.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

FIG. 1 illustrates one embodiment of a cross-sectional view of a cutting tool having a taper;

FIG. 2 illustrates one embodiment of a cross-sectional view of a cutting tool having a steeper taper than that of the embodiment of FIG. 1;

FIG. 10 illustrates one embodiment of a top perspective view of a formed blank;

FIG. 11 illustrates one embodiment of a top perspective view of a cutting tool machined from the blank of FIG. 10;

FIG. 15 illustrates one embodiment of a bottom perspective view of the cutting tool of FIG. 11;

FIG. 16 illustrates one embodiment of a top perspective view of the cutting tool of FIG. 11 showing interior helical coolant channels in dashed lines;

FIG. 19 illustrates one embodiment of a cross-sectional view through line 19-19 of FIG. 18;

FIG. 20 illustrates one embodiment of a cross-sectional view through line 20-20 of FIG. 18;

FIG. 21 illustrates one embodiment of a top view of the cutting tool of FIG. 18;

DETAILED DESCRIPTION

Figure 3:
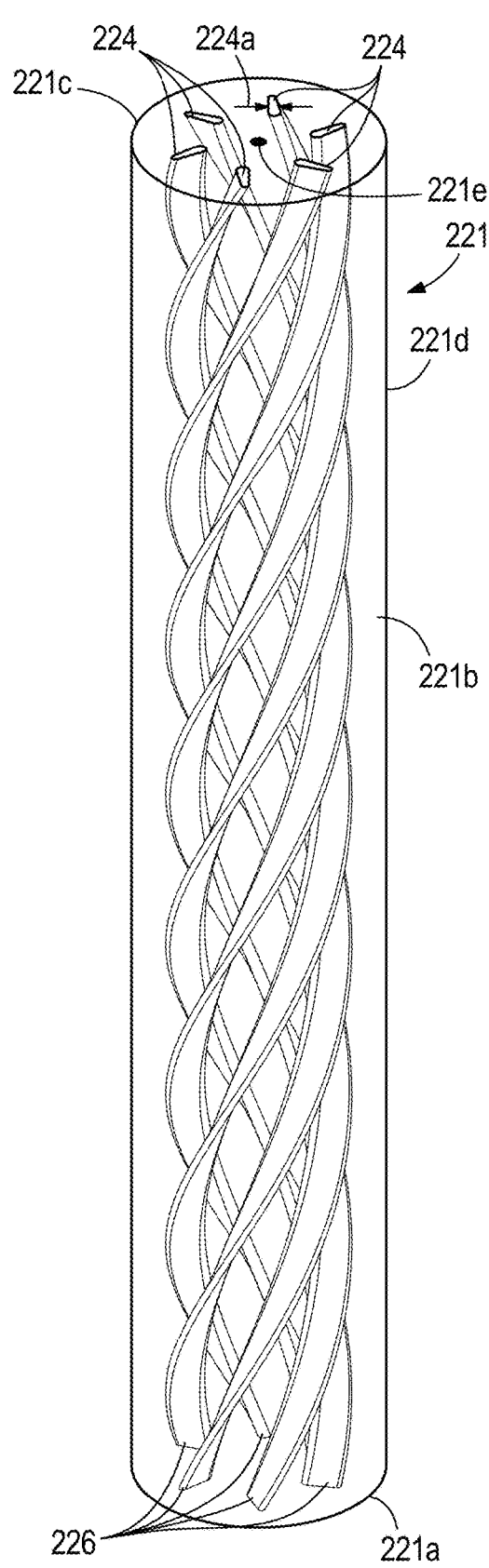
FIG. 3 illustrates one embodiment of a top perspective view of a formed blank.
Figure 4:
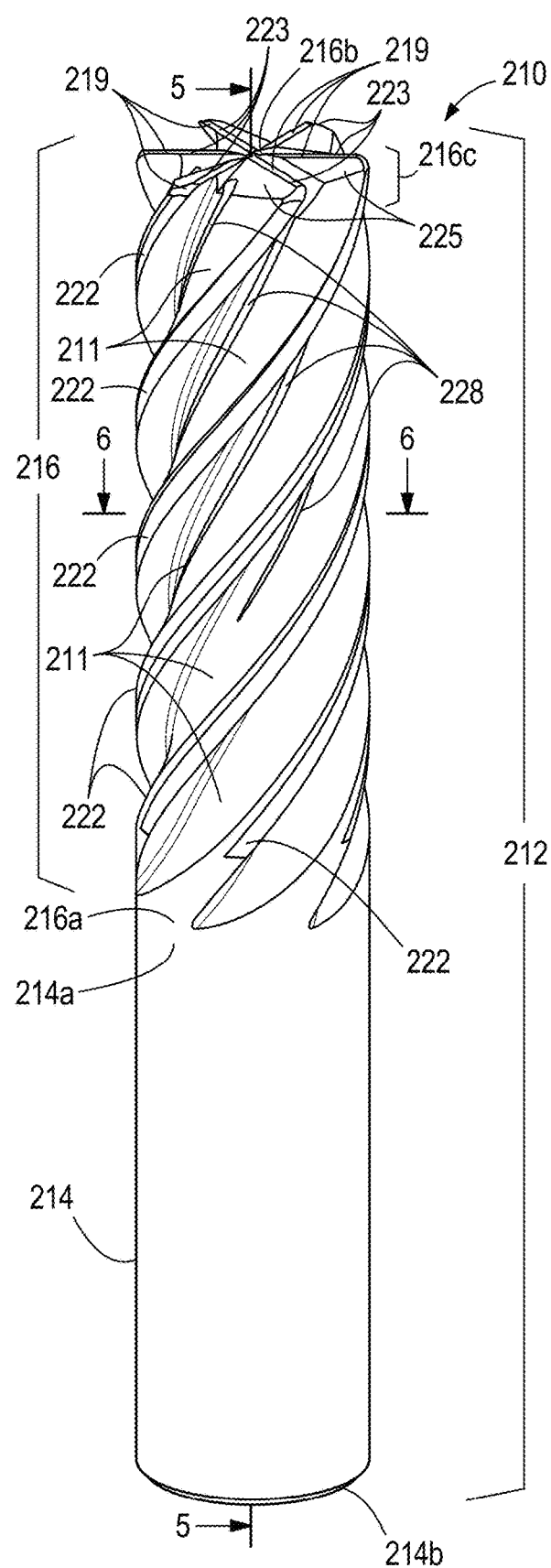
FIG. 4 illustrates one embodiment of a top perspective view of a cutting tool machined from the blank of FIG. 3.
Figure 5:
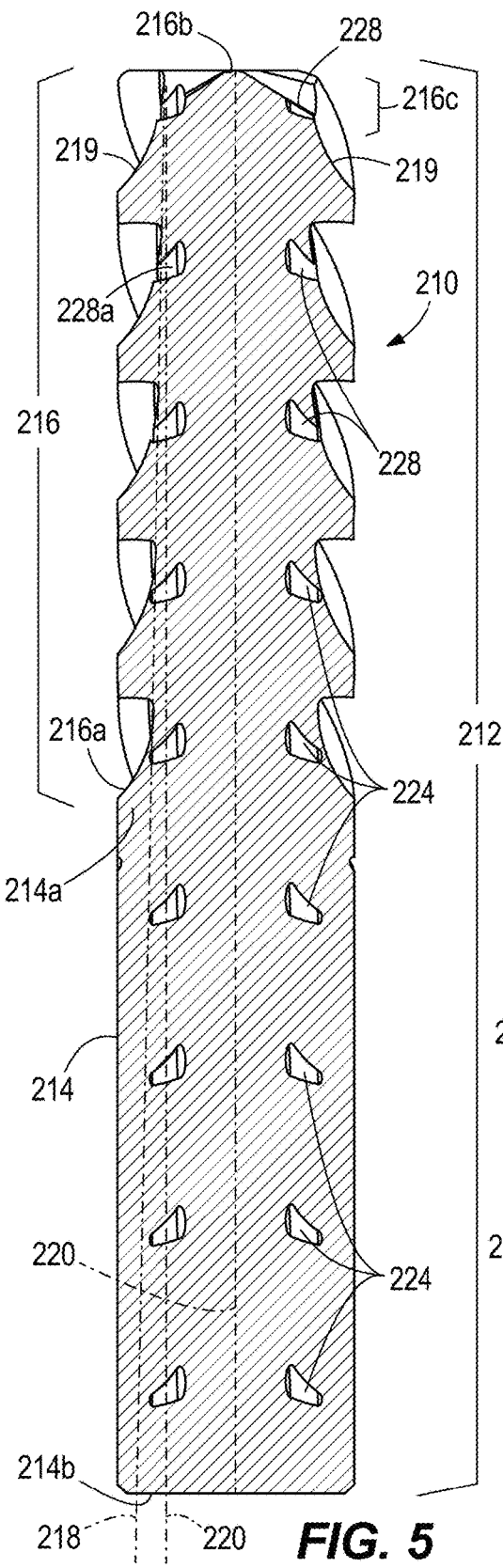
FIG. 5 illustrates one embodiment of a cross-sectional view through line 5-5 of FIG. 4.
Figure 6:
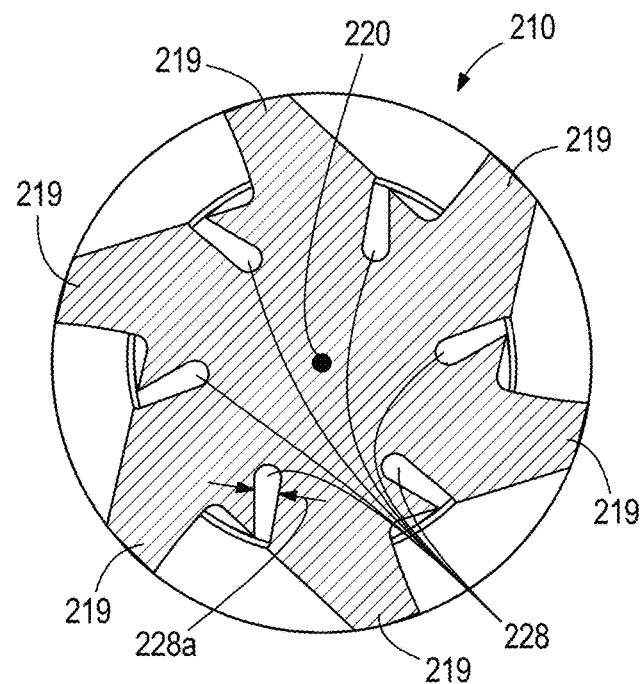
FIG. 6 illustrates one embodiment of a cross-sectional view through line 6-6 of FIG. 4.
Figure 7:
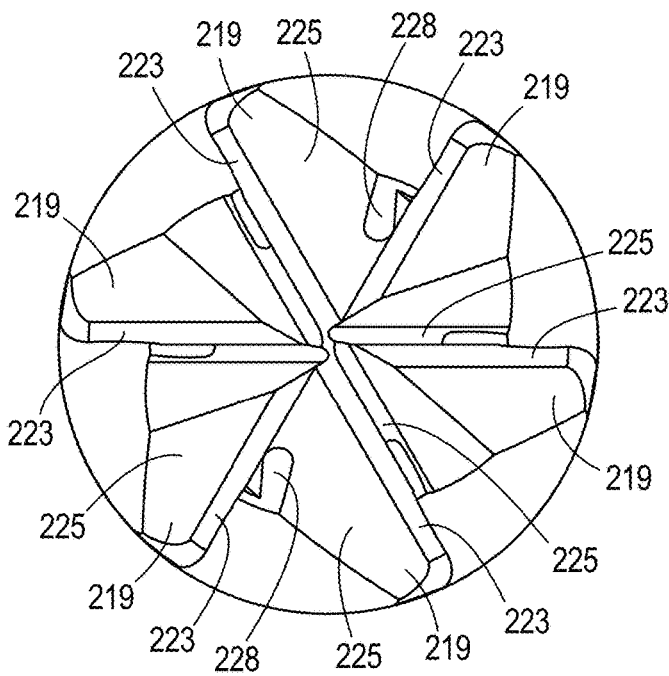
FIG. 7 illustrates one embodiment of a top view of the cutting tool of FIG. 4.
Figure 8:
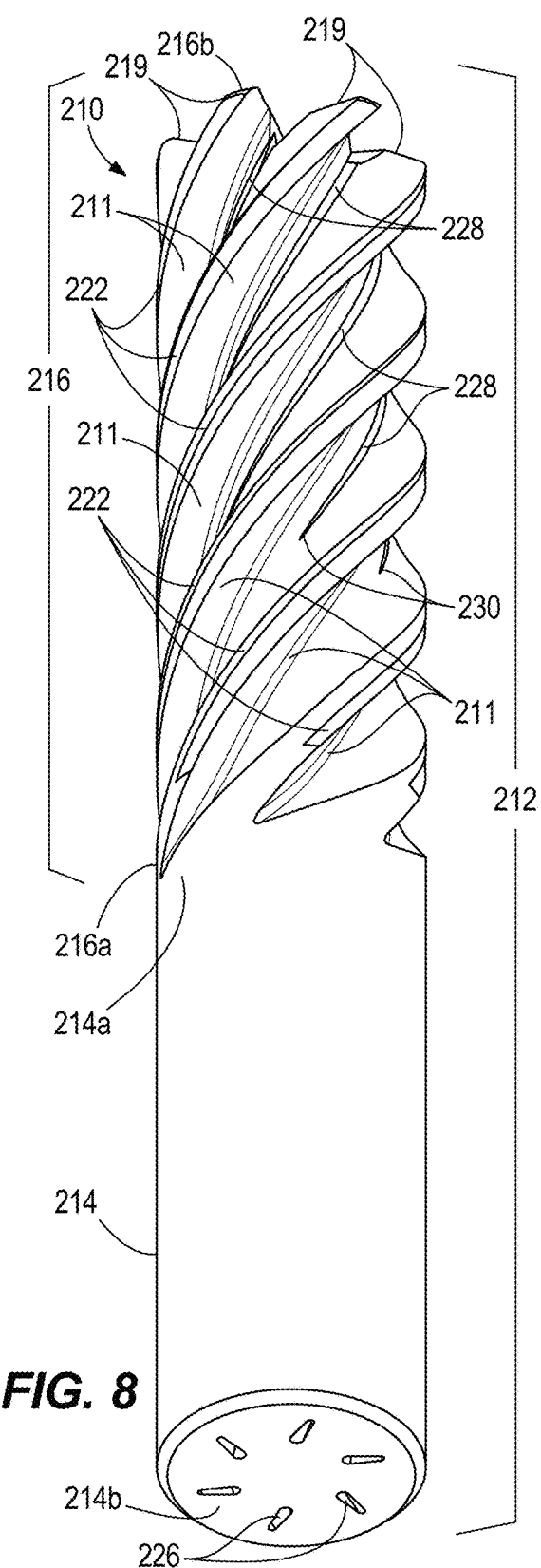
FIG. 8 illustrates one embodiment of a bottom perspective view of the cutting tool of FIG. 4.
Figure 9:
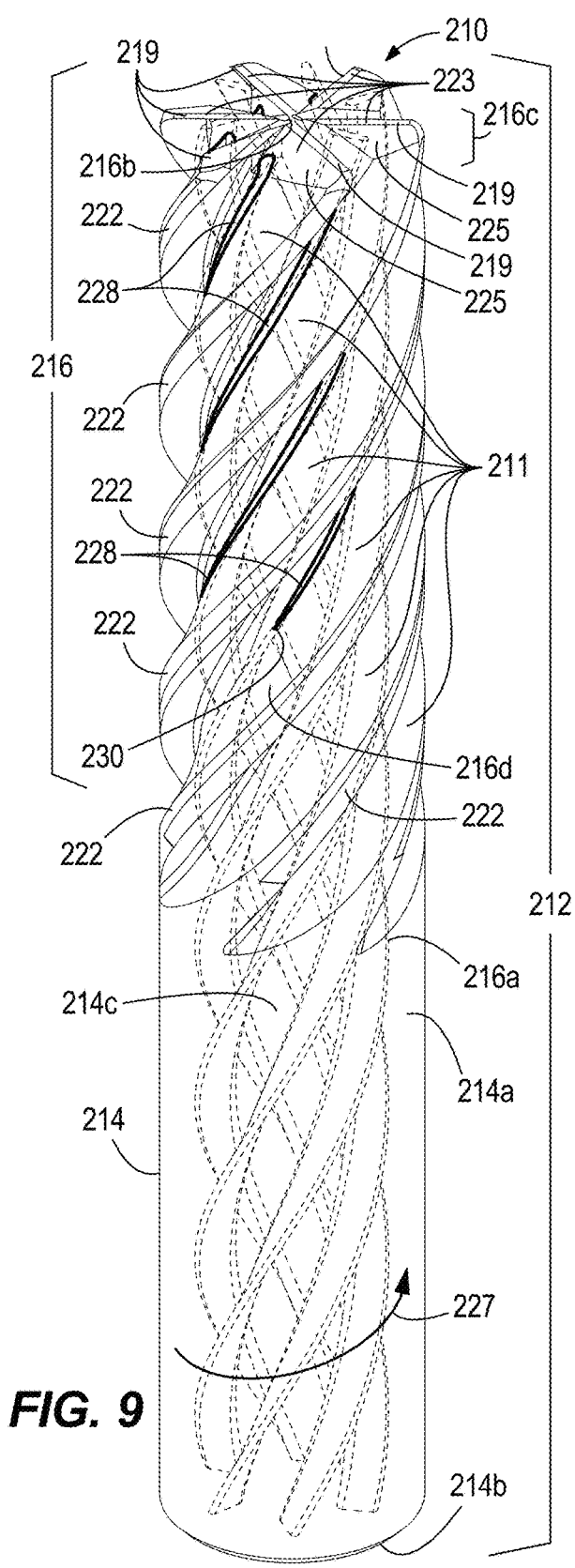
FIG. 9 illustrates one embodiment of a top perspective view of the cutting tool of FIG. 4 showing interior helical coolant channels in dashed lines.
Figure 12:
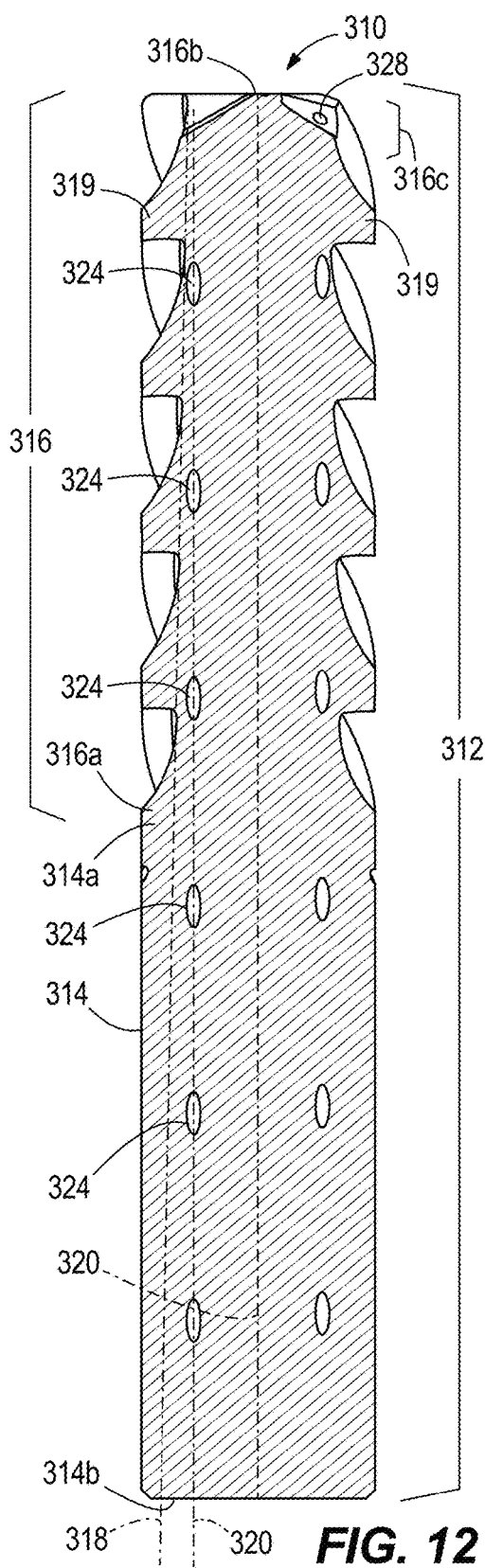
FIG. 12 illustrates one embodiment of a cross-sectional view through line 12-12 of FIG. 11.
Figure 13:
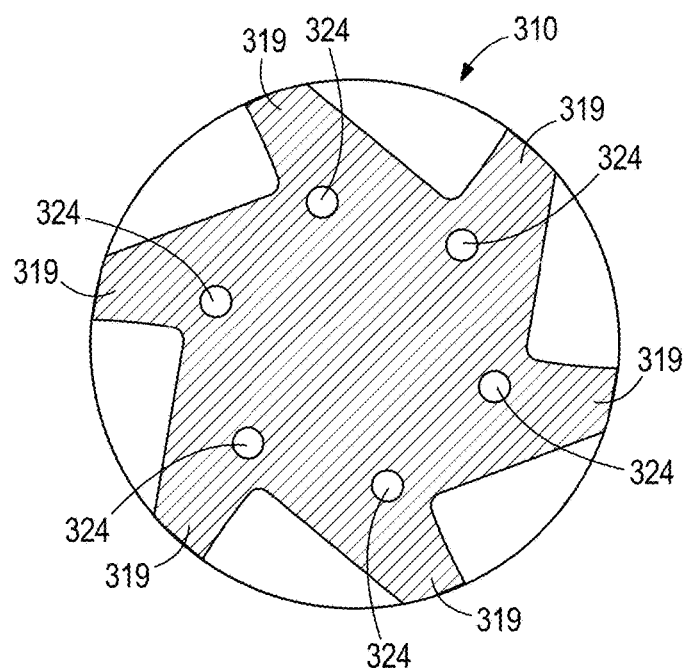
FIG. 13 illustrates one embodiment of a cross-sectional view through line 13-13 of FIG. 11.
Figure 14:
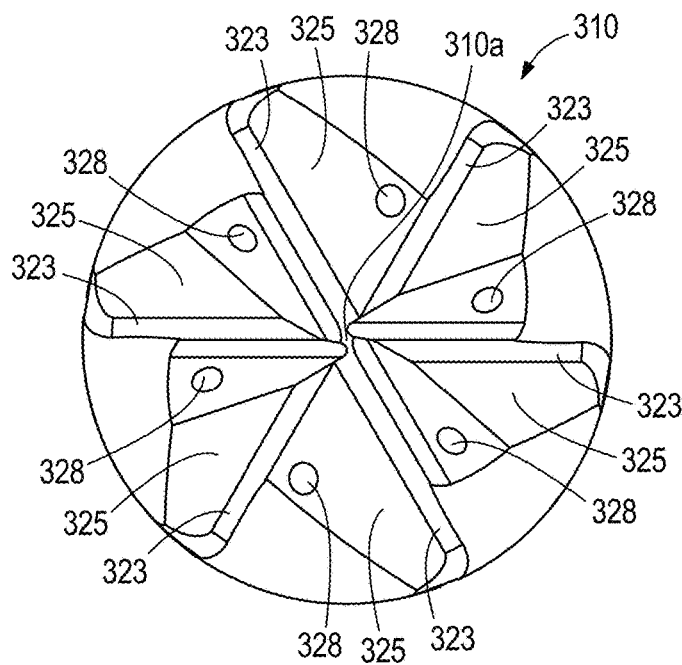
FIG. 14 illustrates one embodiment of a top view of the cutting tool of FIG. 11.

As shown in FIG. 1, in one embodiment of the disclosure, a cutting tool 10 may comprise a body 12 comprising a shank 14 and a tip 16. The cutting tool 10 may comprise an end mill which may be straight or tapered. In other embodiments, the cutting tool 10 may vary in type. The tip 16 may be tapered at an angle 18 relative to a longitudinal axis 20 of the cutting tool 10. The angle 18 ("core taper") may be in a range of 0 to 15 degrees. In other embodiments, the angle 18 may vary in taper relative to the longitudinal axis 20 or not be tapered at all.

As shown in FIG. 2, in another embodiment of the disclosure, a cutting tool 110 may comprise a body 112 comprising a shank 114 and a tip 116. The cutting tool 110 may comprise an end mill which may be straight or tapered. In other embodiments, the cutting tool 110 may vary in type. The tip 116 may be tapered at an angle 118 ("core taper") relative to a longitudinal axis 120 of the cutting tool 110 which is greater than the angle 18 at which the tip 16 of the embodiment of FIG. 1 is tapered. In other embodiments, the angle 118 may vary in taper relative to the longitudinal axis 120 or not be tapered at all.

As shown in FIG. 3, in one embodiment of the disclosure, a blank 221 may be formed to have a plurality of helical coolant channels 224 extending from entrances 226 at or near a bottom 221a of the blank 221, to within an interior 221b of the blank 221, to or near a top 221c of the blank 221. The plurality of helical coolant channels 224 may have a varying cross-sectional width 224a which is smaller closer to an exterior surface 221d of the blank 221 and larger towards a center 221e of the blank 221. The plurality of helical coolant channels 224 may have non-circular cross-sections. In other embodiments, the plurality of helical coolant channels 224 may comprise varying cross-sectional shapes such as circular, tear-drop, or other shapes, or other arbitrary cross-sectional profiles. The blank 221 may be extruded. In other embodiments, the blank 221 may be formed using varying methods.

As shown in FIGS. 4-9, in one embodiment of the disclosure, the blank 221 of FIG. 3 may be machined to form a cutting tool 210. The machining process may comprise grinding. In other embodiments, the machining process may vary. The cutting tool 210 may comprise a body 212 comprising a shank 214 and a tip 216. The cutting tool 210 may comprise an end mill which may be straight or tapered. In other embodiments, the cutting tool 210 may vary in type. The tip 216 may be tapered at an angle 218 relative to a longitudinal axis 220 of the cutting tool 210. The angle 218 may be in a range of 0 to 15 degrees. In other embodiments, the angle 218 may vary in taper relative to the longitudinal axis 220 or not be tapered at all. The tip 216 may comprise a plurality of spaced-apart, helical flutes 219. The spacing between the plurality of spaced-apart, helical flutes 219 may be equal throughout the cutting tool 210. In other embodiments, the spacing between the plurality of spaced-apart, helical flutes 219 may be variable. Each of the plurality of spaced-apart, helical flutes 219 may comprise a helical cutting edge 222 extending from a bottom 216a of the tip 216, adjacent a top 214a of the shank 214, to a top 216b of the tip 216. The top 216b of the tip 216 may comprise a plurality of radially extending cutting edges 223 extending from a center 210a of the tool 210.

The tip 216 may further comprise a plurality of chip gash paths 211. Each of the plurality of chip gash paths 211 may be recessed between two of the respective plurality of spaced-apart, helical flutes 219, and may extend from the bottom 216a of the tip 216 to a top portion 216c of the tip 216 below the top 216b of the tip 216. The tip 216 may further comprise relief surfaces 225 extending from the top 216b of the tip 216 downward to the plurality of chip gash paths 211. Chips of a workpiece cut by the radially extending cutting edges 223 of the cutting tool 210 may follow a path from the relief surfaces 225, to the chip gash paths 211, and ultimately away from the cutting tool 210. Chips of the workpiece cut by the helical cutting edges 222 may follow the chip gash paths 211 away from the cutting tool 210.

The body 212 may further comprise the plurality of helical coolant channels 224 extending from entrances 226 at a bottom 214b of the shank 214, to within an interior 214c of the shank 214, to within an interior 216d of the tip 216, to coolant orifice exits 228 in the tip 216. The plurality of helical coolant channels 224 may rotate in a same direction 227 (i.e. have a same handedness) as the plurality of spaced-apart, helical flutes 219. The coolant orifice exits 228 may be disposed in the plurality of spaced-apart, helical flutes 219 adjacent the plurality of chip gash paths 211, and in the plurality of relief surfaces 225. At least one of the coolant orifice exits 228 may be disposed in each of the plurality of spaced-apart, helical flutes 219, and in each of the plurality of relief surfaces 225. The coolant orifice exits 228 may be spaced-apart from the top 216b of the tip 216. The coolant orifice exits 228 may comprise non-circular, tear-shaped, continuous slots extending from locations 230 spaced-above the bottom 216a of the tip 216 in the plurality of spaced-apart, helical flutes 219 to the plurality of relief surfaces 225. In other embodiments, the coolant orifice exits 228 may be circular, or other shapes. The coolant orifice exits 228 may vary in width 228a along the longitudinal axis 220 of the cutting tool 210 with the width 228a of the coolant orifice exits 228 being narrower towards the bottom 216a of the tip 216 and wider towards the top 216b of the tip 216. The coolant orifice exits 228 may vary along the longitudinal axis 220 with the coolant orifice exits 228 being less exposed towards the bottom 216a of the tip 216 and more exposed towards the top 216b of the tip 216. This may cause coolant pressure to be delivered to the top 216b of the tip 216 of the cutting tool 210. The coolant orifice exits 228 may be oriented to direct coolant at high-wear areas of the tip 216.

In other embodiments, the cutting tool 210, including all portions of the shank 214 and tip 216, may vary in size, shape, or configuration.

As shown in FIG. 10, in one embodiment of the disclosure, a blank 321 may be formed to have a plurality of helical coolant channels 324 extending from entrances 326 at or near a bottom 321a of the blank 321, to within an interior 321b of the blank 321, to or near a top 321c of the blank 321. The plurality of helical coolant channels 324 may have a circular cross-section 324a. In other embodiments, the plurality of helical coolant channels 324 may comprise varying or arbitrary cross-sectional shapes such as non-circular, tear-drop, or other shapes. The blank 321 may be extruded. In other embodiments, the blank 321 may be formed using varying methods.

As shown in FIGS. 11-16, in one embodiment of the disclosure, the blank 321 of FIG. 10 may be machined to form a cutting tool 310. The machining process may comprise grinding. In other embodiments, the machining process may vary. The cutting tool 310 may comprise a body 312 comprising a shank 314 and a tip 316. The cutting tool 310 may comprise an end mill which may be straight or tapered. In other embodiments, the cutting tool 310 may vary in type such as being a square, radiused, ball-end mill, or further varying. The tip 316 may be tapered at an angle 318 relative to a longitudinal axis 320 of the cutting tool 310. The angle 318 may be in a range of 0 to 15 degrees. In other embodiments, the angle 318 may vary in taper relative to the longitudinal axis 320 or not be tapered at all. The tip 316 may comprise a plurality of spaced-apart, helical flutes 319. The spacing between the plurality of spaced-apart, helical flutes 319 may be equal throughout the cutting tool 310. In other embodiments, the spacing between the plurality of spaced-apart, helical flutes 319 may be variable. Each of the plurality of spaced-apart, helical flutes 319 may comprise a helical cutting edge 322 extending from a bottom 316a of the tip 316, adjacent a top 314a of the shank 314, to a top 316b of the tip 316. The top 316b of the tip 316 may comprise a plurality of radially extending cutting edges 323 extending from a center 310a of the tool 310.

The tip 316 may further comprise a plurality of chip gash paths 311. Each of the plurality of chip gash paths 311 may be recessed between two of the respective plurality of spaced-apart, helical flutes 319, and may extend from the bottom 316a of the tip 316 to a top portion 316c of the tip 316 below the top 316b of the tip 316. The tip 316 may further comprise relief surfaces 325 extending from the top 316b of the tip 316 downward to the plurality of chip gash paths 311. Chips of a workpiece cut by the radially extending cutting edges 323 of the cutting tool 310 may follow a path from the relief surfaces 325, to the chip gash paths 311, and ultimately away from the cutting tool 310. Chips of the workpiece cut by the helical cutting edges 322 may follow the chip gash paths 311 away from the cutting tool 310.

The body 312 may further comprise the plurality of helical coolant channels 324 extending from entrances 326 at a bottom 314b of the shank 314, to within an interior 314c of the shank 314, to within an interior 316d of the tip 316, to coolant orifice exits 328 in the tip 316. The plurality of helical coolant channels 324 may rotate in an opposite direction 331 as the plurality of spaced-apart, helical flutes 319. The coolant orifice exits 328 may be disposed only in the plurality of relief surfaces 325, with each of the helical coolant channels 324 only having a single one of the coolant orifice exits 328. At least one of the coolant orifice exits 328 may be disposed in each of the plurality of relief surfaces 325. The coolant orifice exits 328 may be spaced-apart from the top 316b of the tip 316. The coolant orifice exits 328 may comprise circular cross-sections. In other embodiments, the coolant orifice exits 328 may comprise non-circular cross-sections or comprise other shapes. The coolant orifice exits 328 may be oriented to direct coolant to flow at the edge radius/nose 329 where high wear is typically located.

In other embodiments, the cutting tool 310, including all portions of the shank 314 and tip 316, may vary in size, shape, or configuration.

Figure 17:
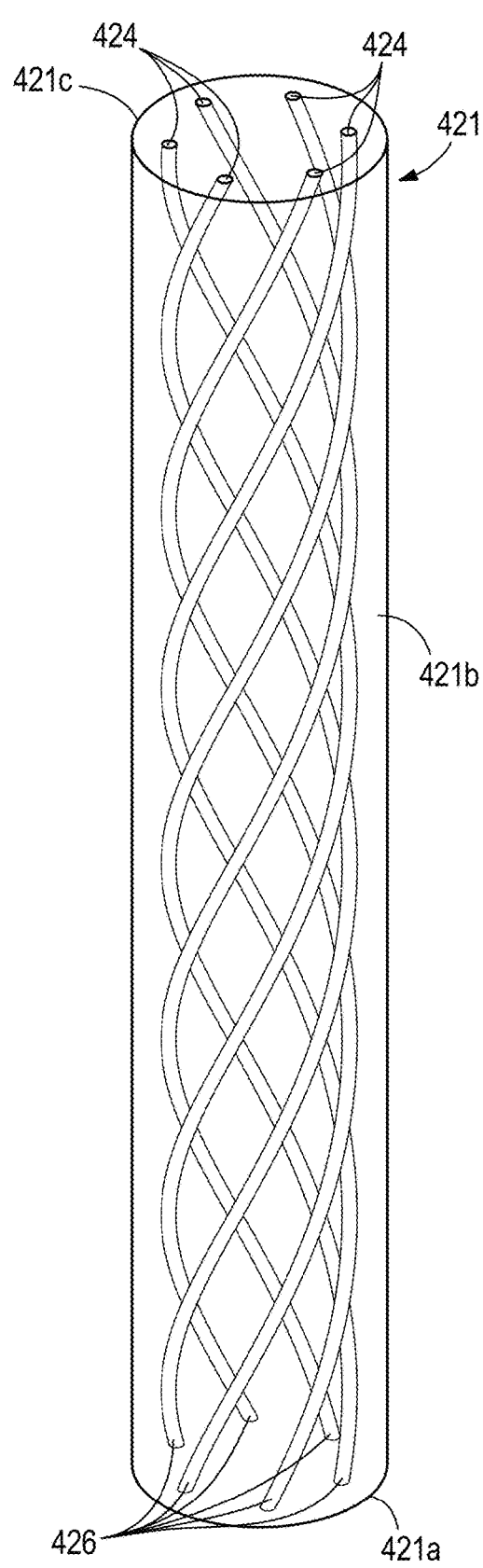
FIG. 17 illustrates one embodiment of a top perspective view of a formed blank.
Figure 18:
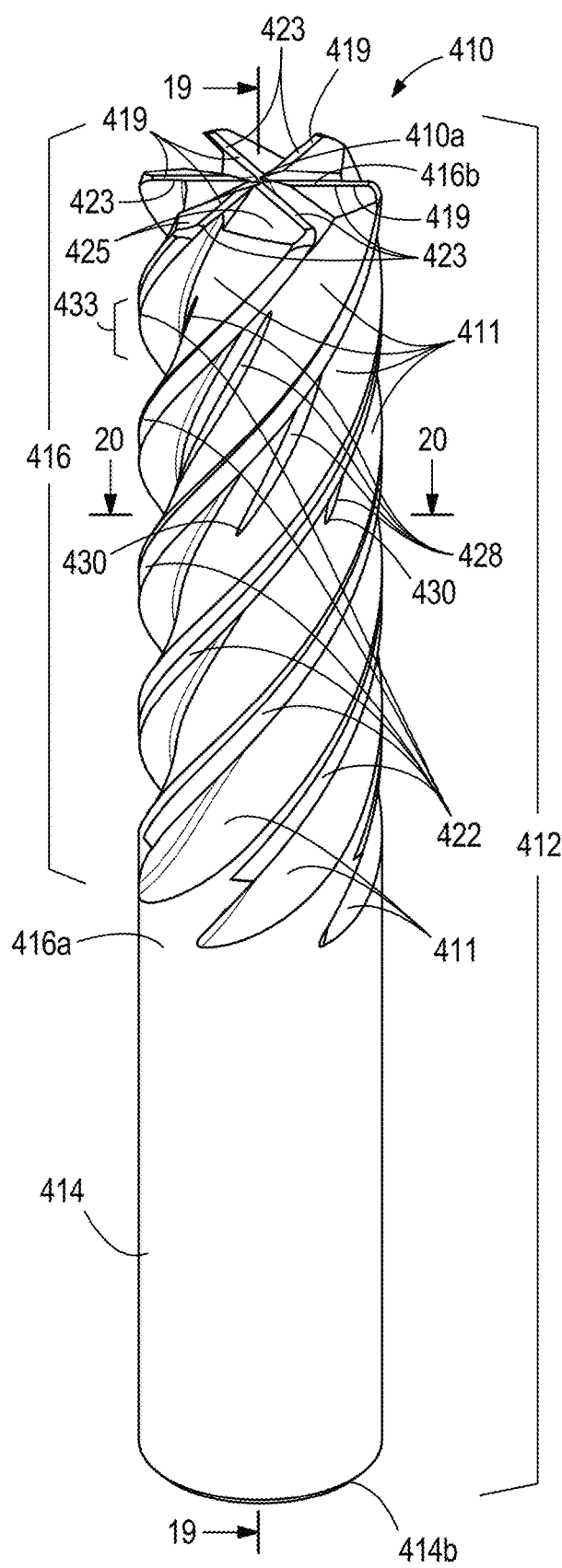
FIG. 18 illustrates one embodiment of a top perspective view of a cutting tool machined from the blank of FIG. 17.
Figure 22:
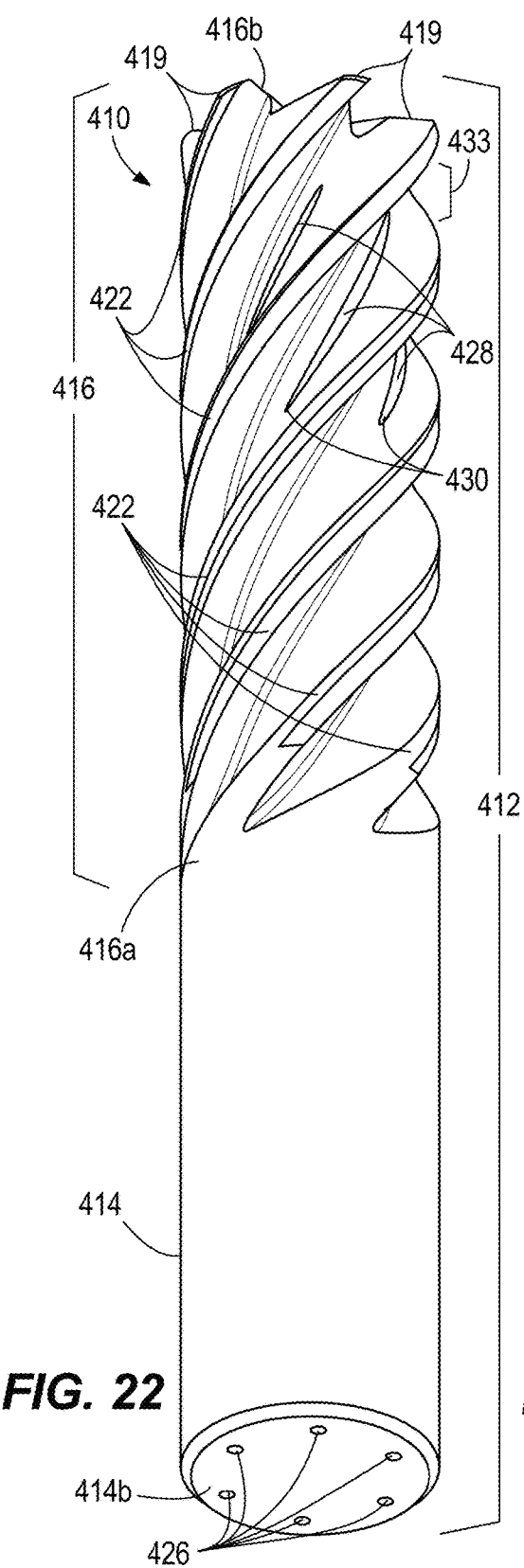
FIG. 22 illustrates one embodiment of a bottom perspective view of the cutting tool of FIG. 18.
Figure 23:
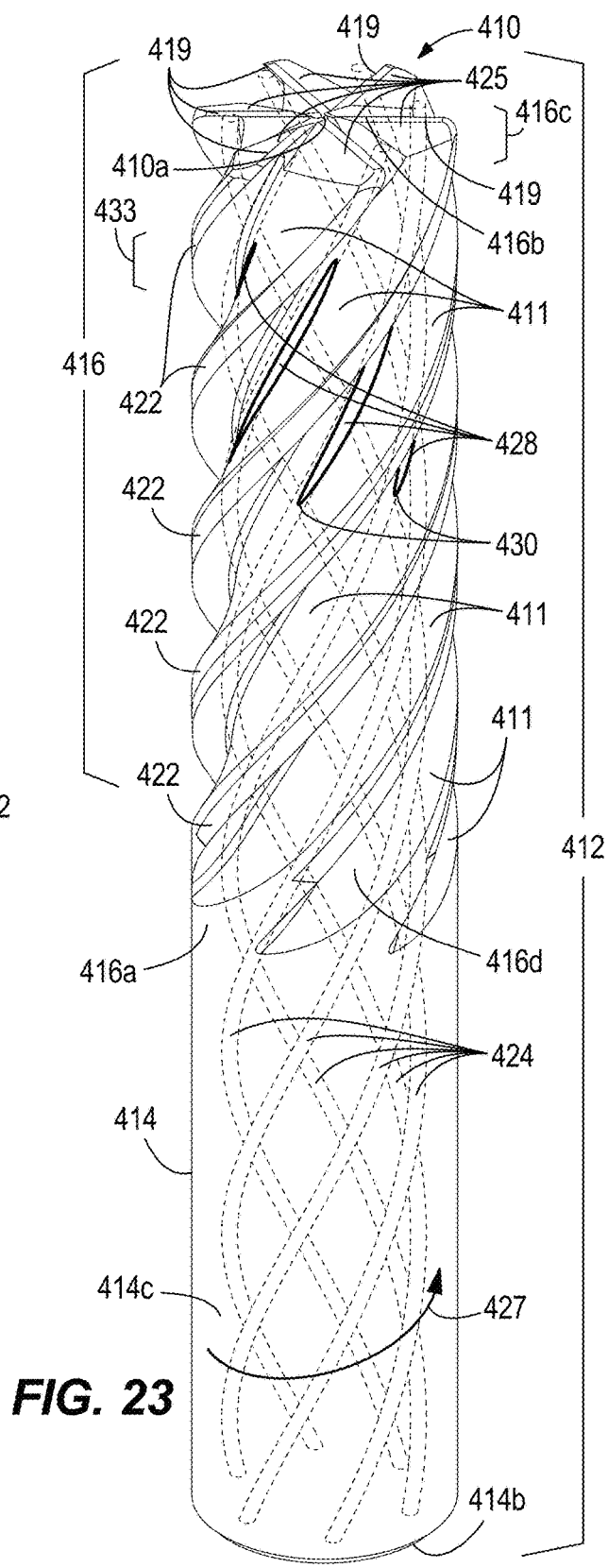
FIG. 23 illustrates one embodiment of a top perspective view of the cutting tool of FIG. 18 showing interior helical coolant channels in dashed lines.

As shown in FIG. 17, in one embodiment of the disclosure, a blank 421 may be formed to have a plurality of helical coolant channels 424 extending from entrances 426 at or near a bottom 421a of the blank 421, to within an interior 421b of the blank 421, to or near a top 421c of the blank 421. The plurality of helical coolant channels 424 may comprise circular cross-sections. In other embodiments, the plurality of helical coolant channels 424 may comprise varying cross-sectional shapes such as non-circular, tear-drop, or other shapes. The blank 421 may be extruded. In other embodiments, the blank 421 may be formed using varying methods.

As shown in FIGS. 18-23, in one embodiment of the disclosure, the blank 421 of FIG. 17 may be machined to form a cutting tool 410. The machining process may comprise grinding. In other embodiments, the machining process may vary. The cutting tool 410 may comprise a body 412 comprising a shank 414 and a tip 416. The cutting tool 410 may comprise an end mill which may be straight or tapered. In other embodiments, the cutting tool 410 may vary in type. The tip 416 may be tapered at an angle 418 relative to a longitudinal axis 420 of the cutting tool 410. The angle 418 may be in a range of 0 to 15 degrees. In other embodiments, the angle 418 may vary in taper relative to the longitudinal axis 420 or not be tapered at all. The tip 416 may comprise a plurality of spaced-apart, helical flutes 419. The spacing between the plurality of spaced-apart, helical flutes 419 may be equal throughout the cutting tool 410. In other embodiments, the spacing between the plurality of spaced-apart, helical flutes 419 may be variable. Each of the plurality of spaced-apart, helical flutes 419 may comprise a helical cutting edge 422 extending from a bottom 416a of the tip 416, adjacent a top 414a of the shank 414, to a top 416b of the tip 416. The top 416b of the tip 416 may comprise a plurality of radially extending cutting edges 423 extending from a center 410a of the tool 410.

The tip 416 may further comprise a plurality of chip gash paths 411. Each of the plurality of chip gash paths 411 may be recessed between two of the respective plurality of spaced-apart, helical flutes 419, and may extend from the bottom 416a of the tip 416 to a top portion 416c of the tip 416 below the top 416b of the tip 416. The tip 416 may further comprise relief surfaces 425 extending from the top 416b of the tip 416 downward to the plurality of chip gash paths 411. Chips of a workpiece cut by the radially extending cutting edges 423 of the cutting tool 410 may follow a path from the relief surfaces 425, to the chip gash paths 411, and ultimately away from the cutting tool 410. Chips of the workpiece cut by the helical cutting edges 422 may follow the chip gash paths 411 away from the cutting tool 410.

The body 412 may further comprise the plurality of helical coolant channels 424 extending from entrances 426 at a bottom 414b of the shank 414, to within an interior 414c of the shank 414, to within an interior 416d of the tip 416, to coolant orifice exits 428 in the tip 416. The plurality of helical coolant channels 424 may rotate in a same direction 427 (i.e. have a same handedness) as the plurality of spaced-apart, helical flutes 419. The coolant orifice exits 428 may be disposed only in the plurality of spaced-apart, helical flutes 419 adjacent the plurality of chip gash paths 411. At least one of the coolant orifice exits 428 may be disposed in each of the plurality of spaced-apart, helical flutes 419. The coolant orifice exits 428 may be spaced-apart from the top 416b of the tip 416. The coolant orifice exits 428 may comprise non-circular, continuous slots extending from locations 430 spaced-above the bottom 416a of the tip 416 in the plurality of spaced-apart, helical flutes 419 to an upper portion 433 of the tip 416 disposed below the plurality of relief surfaces 425. In other embodiments, the coolant orifice exits 428 may be circular, or other shapes. The coolant orifice exits 428 may be oriented to direct coolant at high-wear areas of the tip 416.

In other embodiments, the cutting tool 410, including all portions of the shank 414 and tip 416, may vary in size, shape, or configuration.

Figure 24:
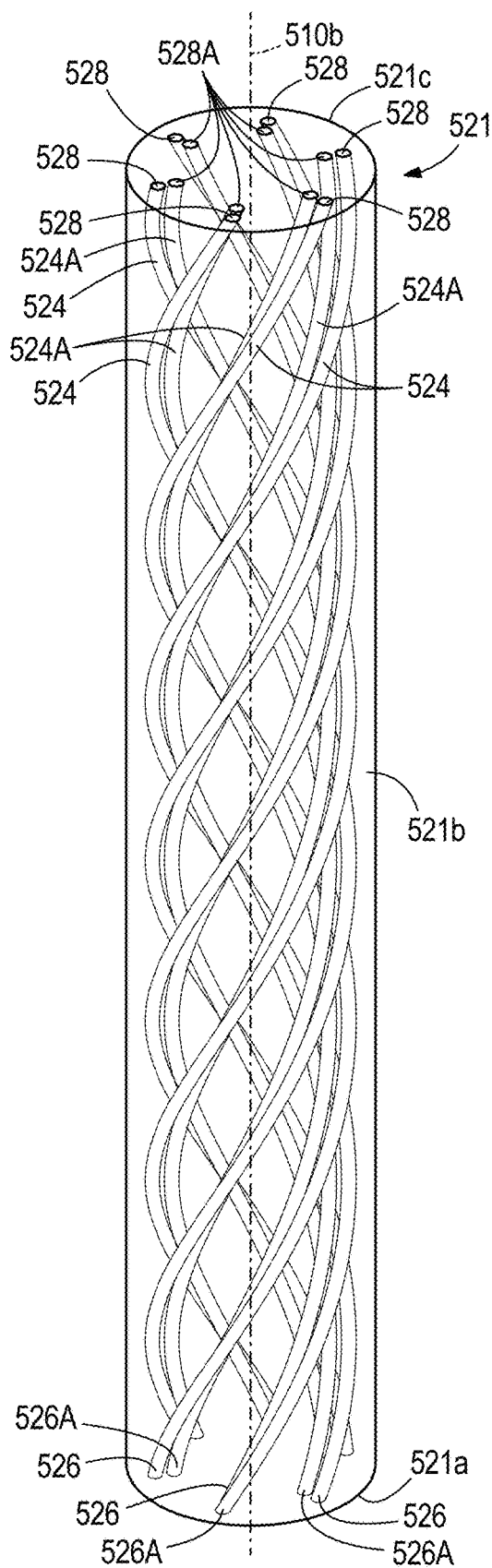
FIG. 24 illustrates one embodiment of a top perspective view of a formed blank.
Figure 25:
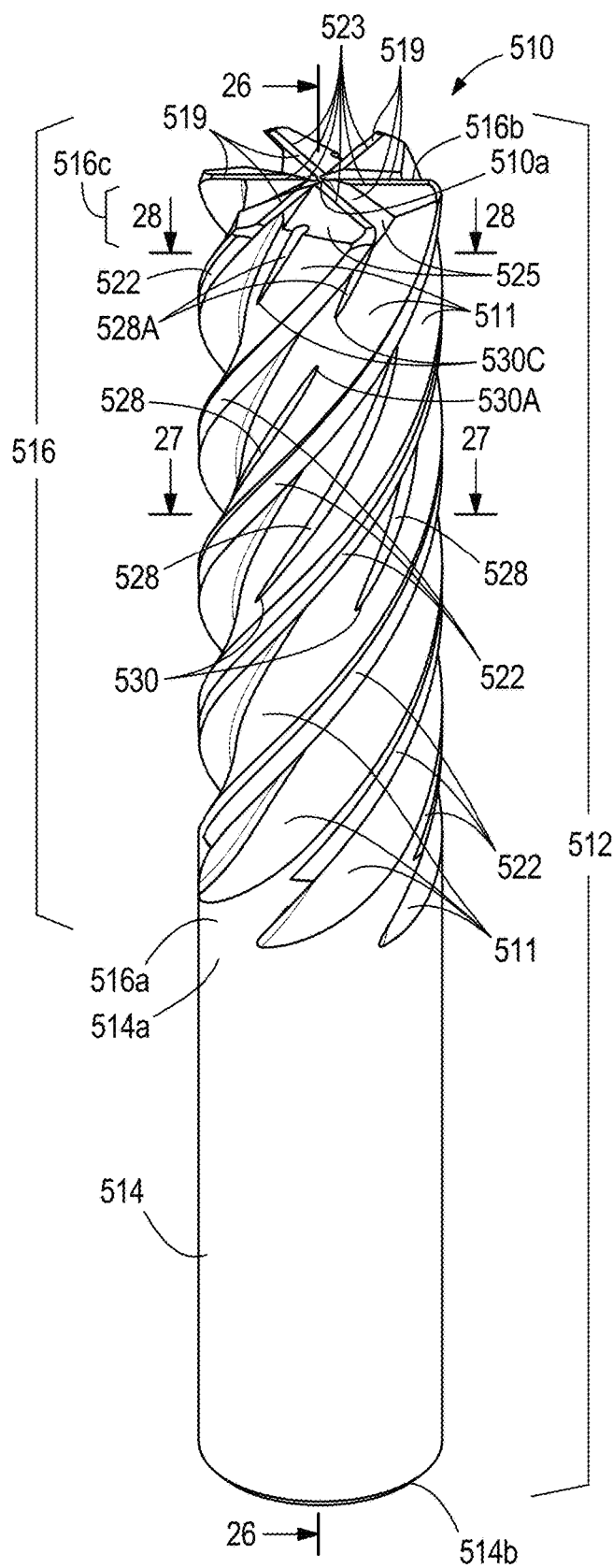
FIG. 25 illustrates one embodiment of a top perspective view of a cutting tool machined from the blank of FIG. 24.
Figure 26:
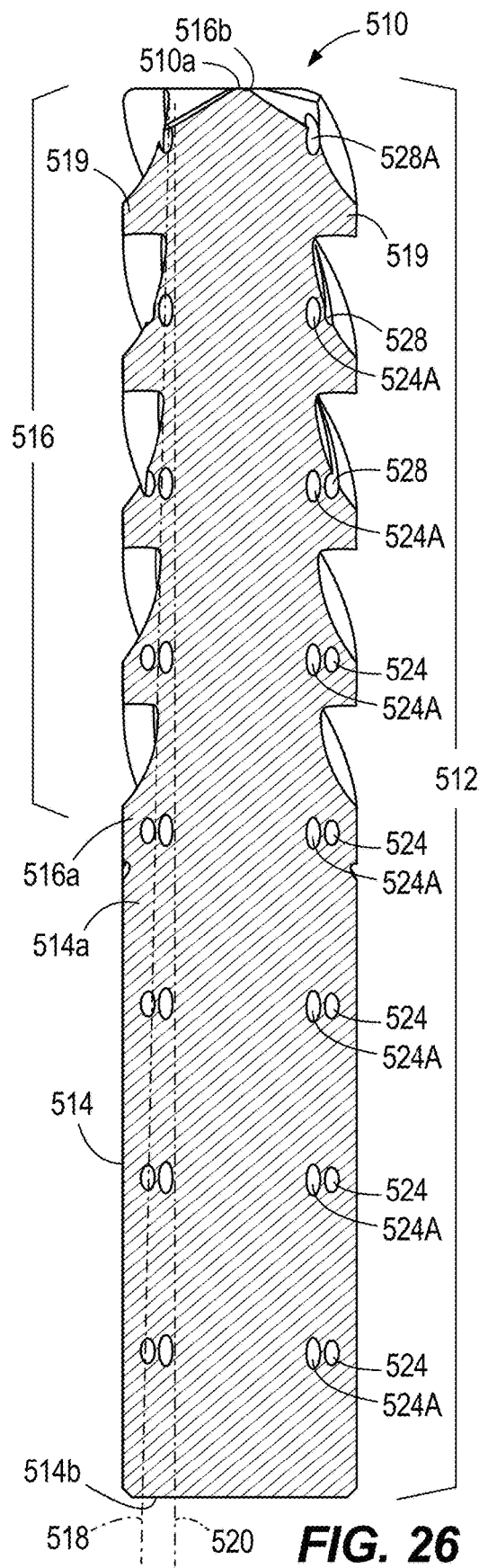
FIG. 26 illustrates one embodiment of a cross-sectional view through line 26-26 of FIG. 25.
Figure 27:
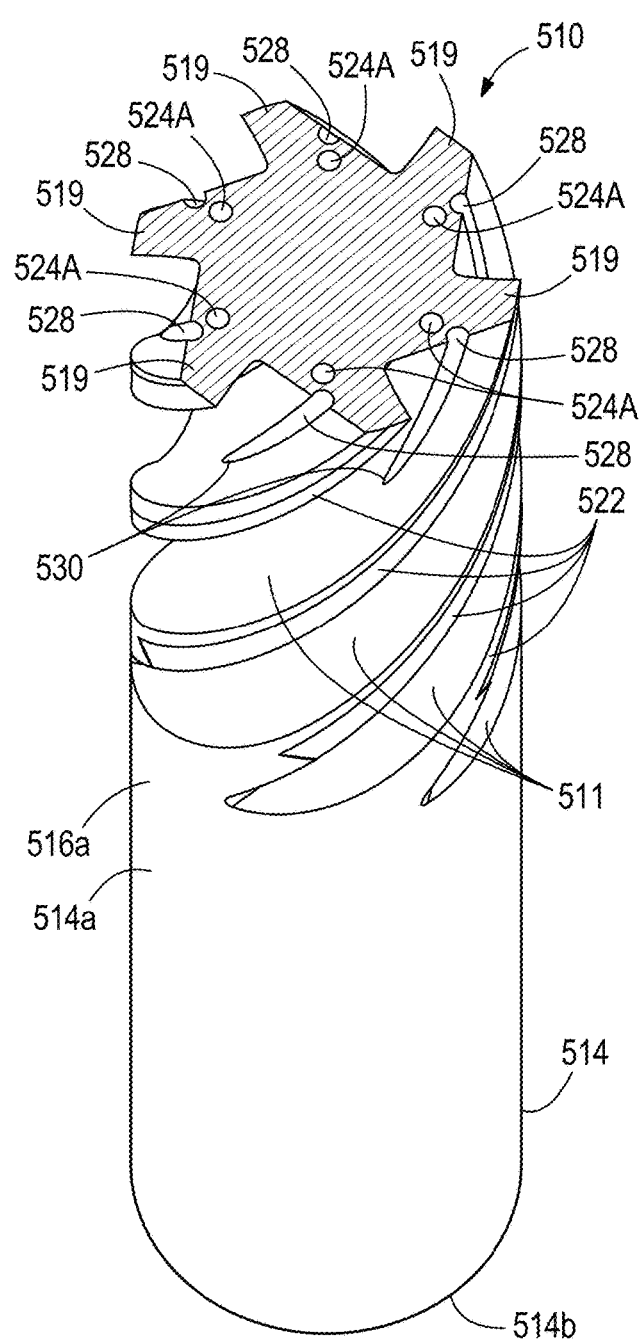
FIG. 27 illustrates one embodiment of a cross-sectional view through line 27-27 of FIG. 25.
Figures 28, 29:
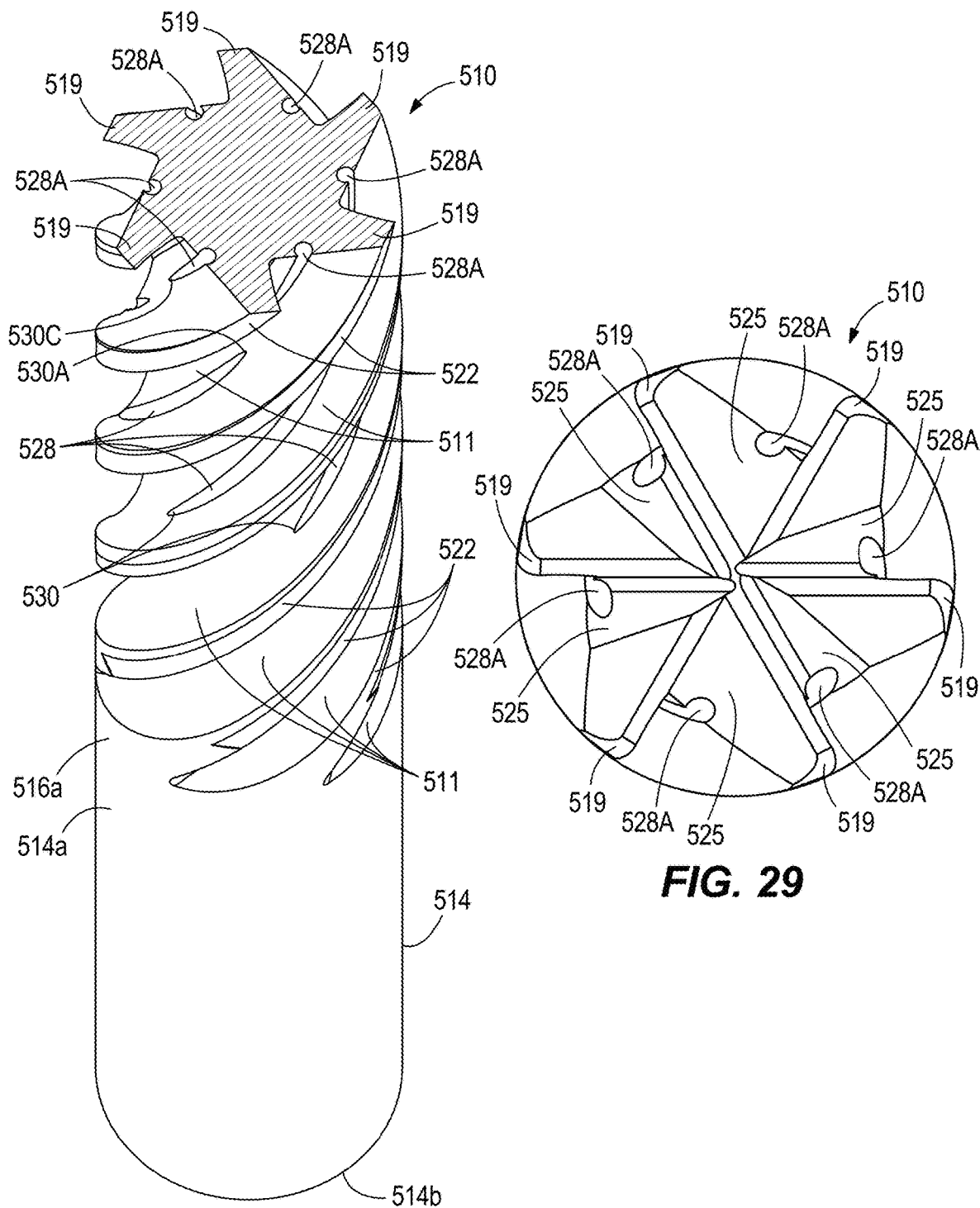
FIG. 28 illustrates one embodiment of a cross-sectional view through line 28-28 of FIG. 25.
FIG. 29 illustrates one embodiment of a top view of the cutting tool of FIG. 25.
Figure 30:
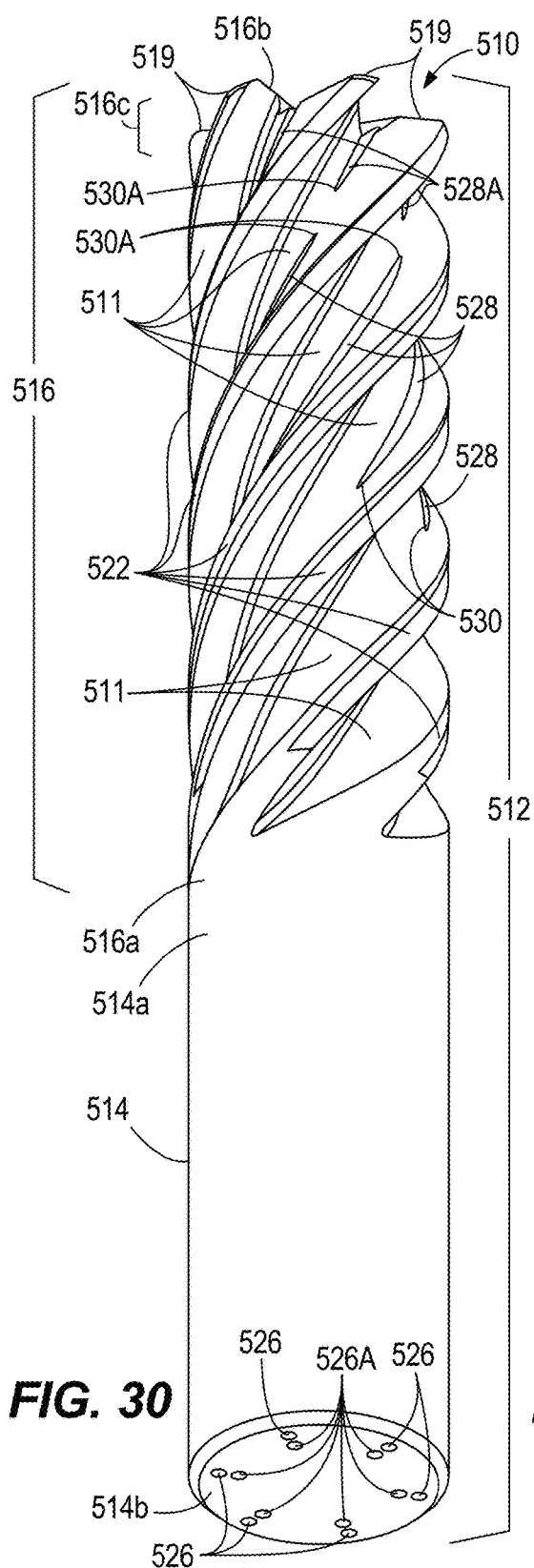
FIG. 30 illustrates one embodiment of a bottom perspective view of the cutting tool of FIG. 25.
Figure 31:
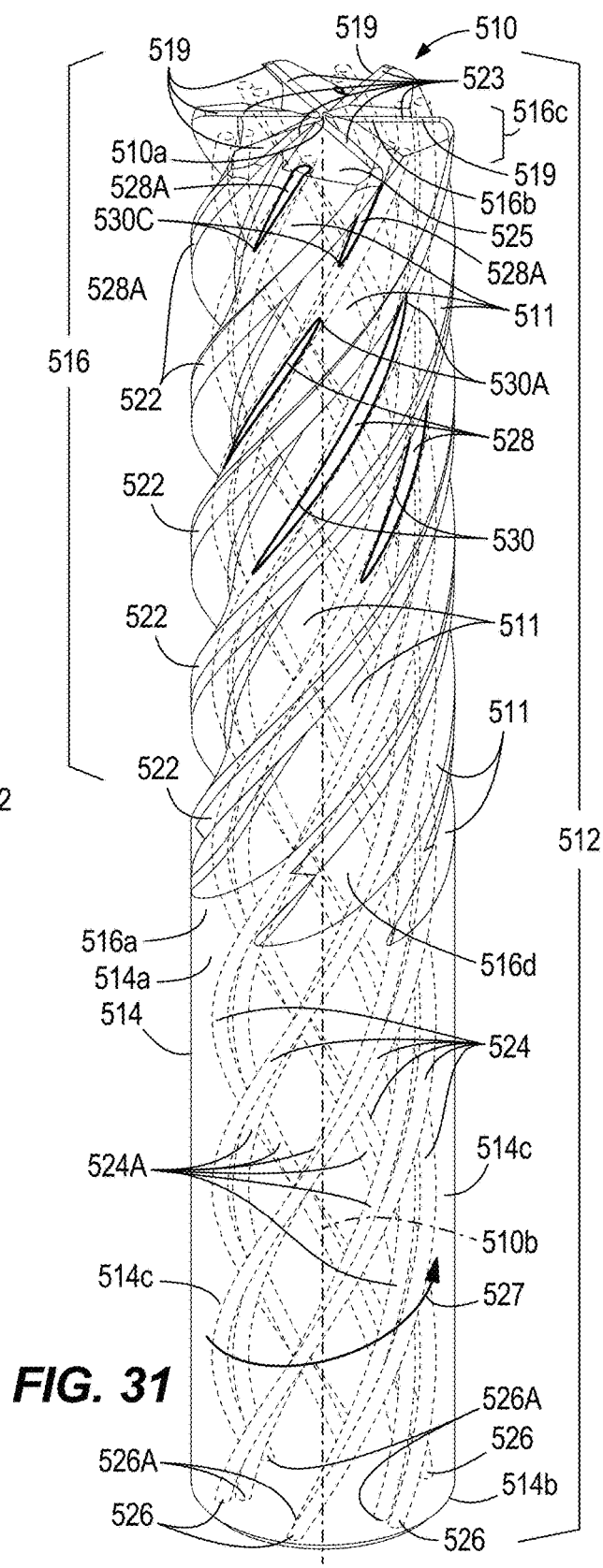
FIG. 31 illustrates one embodiment of a top perspective view of the cutting tool of FIG. 25 showing interior helical coolant channels in dashed lines.

As shown in FIG. 24, in one embodiment of the disclosure, a blank 521 may be formed to have a plurality of helical coolant channels 524 and 524A extending from entrances 526 and 526A at or near a bottom 521a of the blank 521, to within an interior 521b of the blank 521, to or near a top 521c of the blank 521. The plurality of helical coolant channels 524 and 524A may have circular cross-sections. In other embodiments, the plurality of helical coolant channels 524 and 524A may have varying shaped cross-sectional shapes such as non-circular, tear-drop, or other shapes. The plurality of helical coolant channels 524 and 524A may be disposed in pairs adjacent to one another. Helical coolant channels 524 may comprise the outer helical coolant channels and helical coolant channels 524A may comprise the inner helical coolant channels. Helical coolant channels 524A may be disposed closer to a center longitudinal axis 510b extending through the blank 521 than helical coolant channels 524. The blank 521 may be extruded. In other embodiments, the blank 521 may be formed using varying methods.

As shown in FIGS. 25-31, in one embodiment of the disclosure, the blank 521 of FIG. 24 may be machined to form a cutting tool 510. The machining process may comprise grinding. In other embodiments, the machining process may vary. The cutting tool 510 may comprise a body 512 comprising a shank 514 and a tip 516. The cutting tool 510 may comprise an end mill which may be straight or tapered. In other embodiments, the cutting tool 510 may vary in type. The tip 516 may be tapered at an angle 518 relative to a longitudinal axis 520 of the cutting tool 510. The angle 518 may be in a range of 0 to 15 degrees. In other embodiments, the angle 518 may vary in taper relative to the longitudinal axis 520 or not be tapered at all. The tip 516 may comprise a plurality of spaced-apart, helical flutes 519. The spacing between the plurality of spaced-apart, helical flutes 519 may be equal throughout the cutting tool 510. In other embodiments, the spacing between the plurality of spaced-apart, helical flutes 519 may be variable. Each of the plurality of spaced-apart, helical flutes 519 may comprise a helical cutting edge 522 extending from a bottom 516a of the tip 516, adjacent a top 514a of the shank 514, to a top 516b of the tip 516. The top 516b of the tip 516 may comprise a plurality of radially extending cutting edges 523 extending from a center 510a of the tool 510.

The tip 516 may further comprise a plurality of chip gash paths 511. Each of the plurality of chip gash paths 511 may be recessed between two of the respective plurality of spaced-apart, helical flutes 519, and may extend from the bottom 516a of the tip 516 to a top portion 516c of the tip 516 below the top 516b of the tip 516. The tip 516 may further comprise relief surfaces 525 extending from the top 516b of the tip 516 downward to the plurality of chip gash paths 511. Chips of a workpiece cut by the radially extending cutting edges 523 of the cutting tool 510 may follow a path from the relief surfaces 525, to the chip gash paths 511, and ultimately away from the cutting tool 510. Chips of the workpiece cut by the helical cutting edges 522 may follow the chip gash paths 511 away from the cutting tool 510.

The body 512 may further comprise the plurality of helical coolant channels 524 and 524A extending from entrances 526 and 526A at a bottom 514b of the shank 514, to within an interior 514c of the shank 514, to within an interior 516d of the tip 516, to different coolant orifice exits 528 and 528A in the tip 516. Helical coolant channels 524A may be disposed closer to a center longitudinal axis 510b extending through the tool 510 than helical coolant channels 524. The plurality of helical coolant channels 524 and 524A may rotate in a same direction 527 (i.e. have a same handedness) as the plurality of spaced-apart, helical flutes 519. The coolant orifice exits 528 may only be disposed in the plurality of spaced-apart, helical flutes 519 adjacent the plurality of chip gash paths 511. The coolant orifice exits 528A may be disposed in both the plurality of spaced-apart, helical flutes 519, and in each of the plurality of relief surfaces 525. The coolant orifice exits 528 and 528A may be spaced-apart from the top 516b of the tip 516. The coolant orifice exits 528 may comprise non-circular, continuous slots extending from locations 530 spaced-above the bottom 516a of the tip 516 in the plurality of spaced-apart, helical flutes 519 to locations 530a below the plurality of relief surfaces 525. The coolant orifice exits 528A may comprise non-circular, continuous slots extending from locations 530c spaced-above the bottom 516a of the tip 516 in the plurality of spaced-apart, helical flutes 519 to the plurality of relief surfaces 525. In other embodiments, the coolant orifice exits 528 and 528A may be circular, or other shapes. The coolant orifice exits 528 and 528A may be oriented to direct coolant at high-wear areas of the tip 516.

In other embodiments, the cutting tool 510, including all portions of the shank 514 and tip 516, may vary in size, shape, or configuration.

Figure 32:
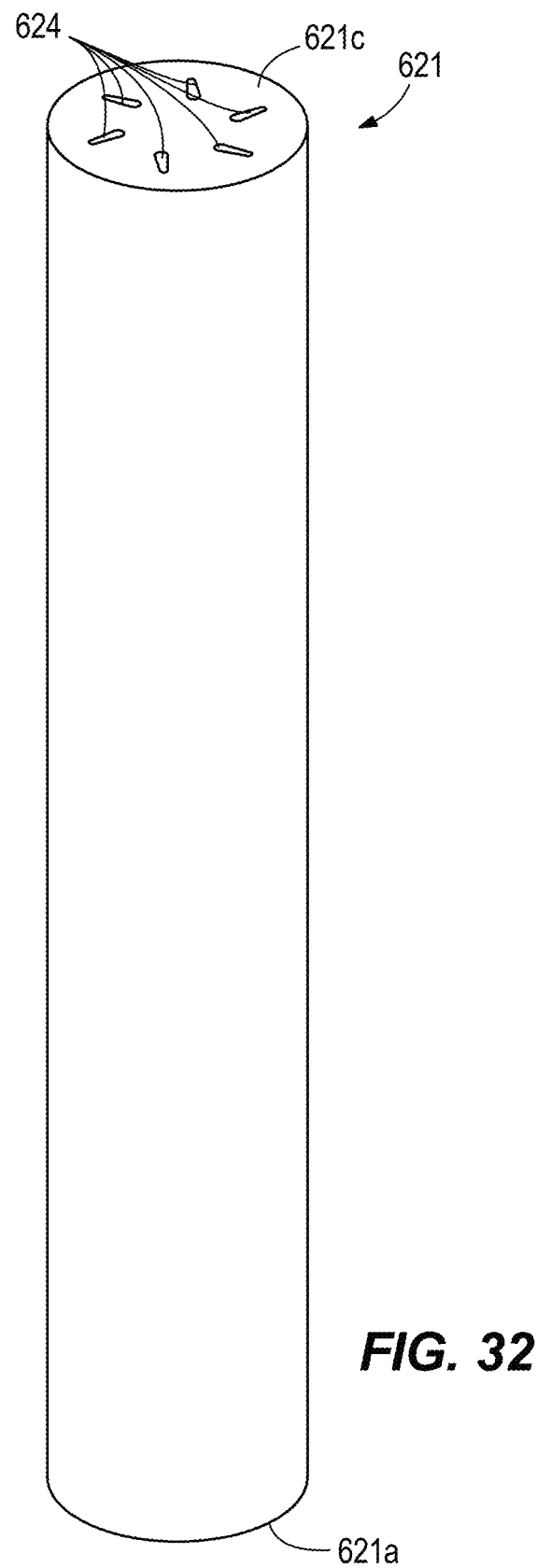
FIG. 32 illustrates one embodiment of a top perspective view of a formed blank showing interior helical coolant channels in dashed lines.

As shown in FIG. 32, in one embodiment of the disclosure, a blank 621 may be formed by extruding the blank 621 to have a plurality of helical coolant channels 624 extending from entrances (hidden) at the bottom 621a of the blank 621, to within an interior (hidden) of the blank 621, to or near the top 621c of the blank 621. The blank 621 may be subsequently machined to any of the embodiments disclosed herein, or in still other embodiments, to have varying configurations.

Figure 33:
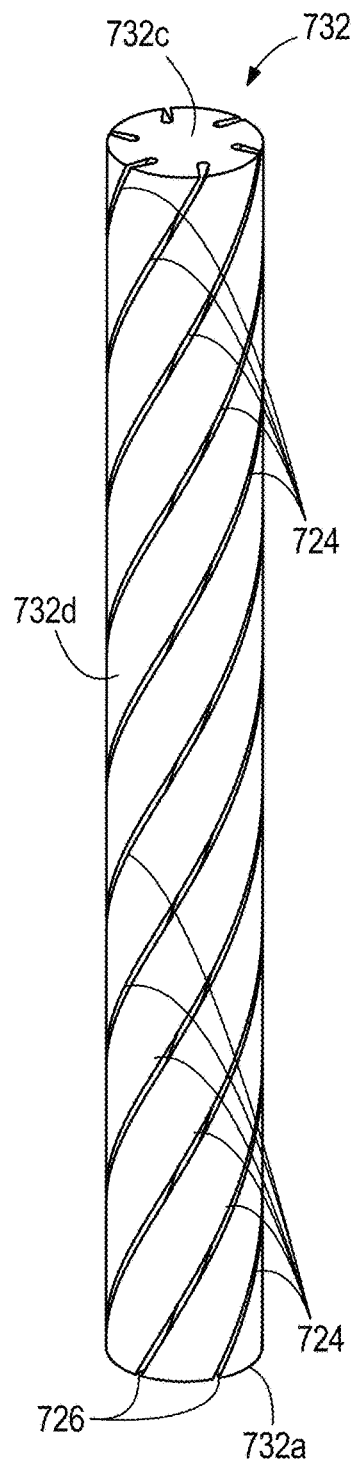
FIG. 33 illustrates one embodiment of a top perspective view of a formed outer portion having an interior cavity.

As shown in FIG. 33, in one embodiment of the disclosure, an inner portion 732 may be formed by extruding the inner portion 732 to have a plurality of helical coolant channels 724 extending from entrances 726 at or near a bottom 732a of the inner portion 732 to or near a top 732c of the inner portion 732. The inner portion 732 may be cylindrical. The plurality of helical coolant channels 724 may be disposed around an outer surface 732d of the inner portion 732 and may be exposed (open). In other embodiments, the inner portion 732 may vary.

Figure 34:
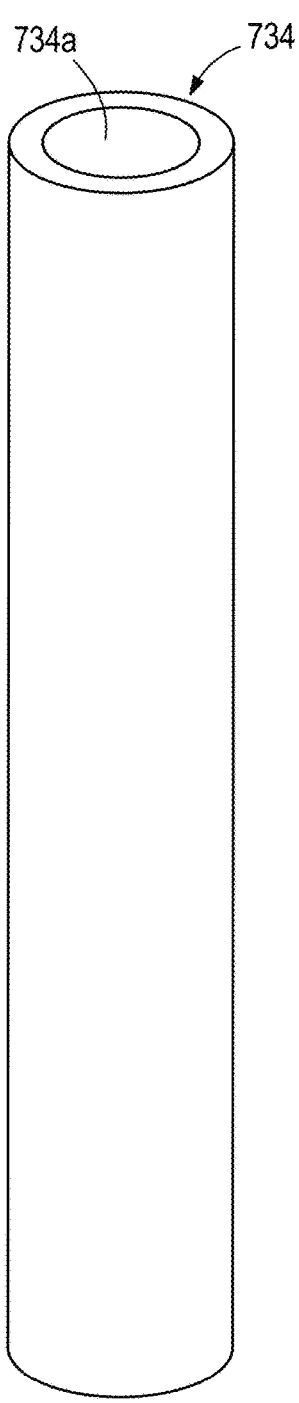
FIG. 34 illustrates one embodiment of a top perspective view of a formed inner portion.

As shown in FIG. 34, in one embodiment of the disclosure, an outer portion 734 may be formed by extruding the outer portion 734 to have an interior cavity 734a. The outer portion 734 may comprise a hollow cylinder. In other embodiments, the outer portion 734 may vary.

Figure 35:
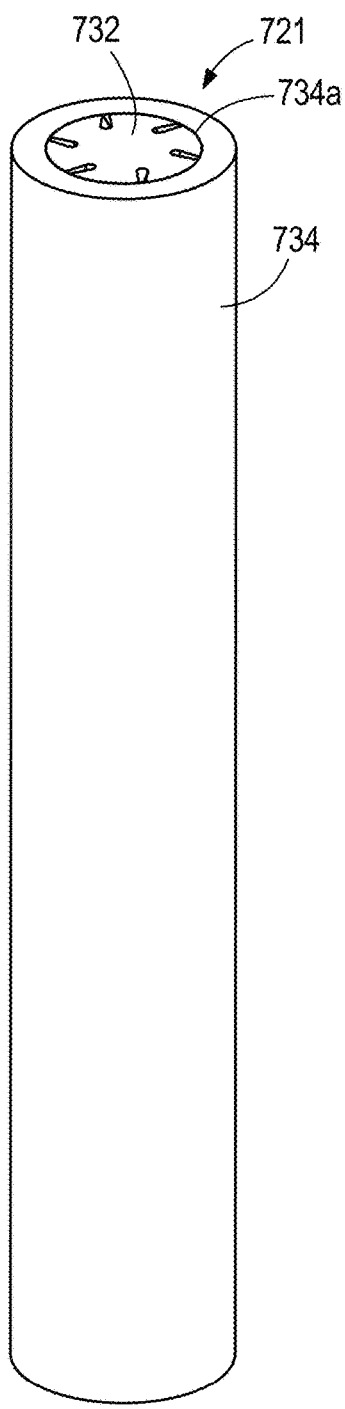
FIG. 35 illustrates one embodiment of a top perspective view of the formed inner portion of FIG. 34 fused within the interior cavity of the formed outer portion of FIG. 33.

As shown in FIG. 35, in one embodiment of the disclosure, a blank 721 may be formed by inserting the inner portion 732 of FIG. 33 within the interior cavity 734a of the outer portion 734 of FIG. 34, and fusing the inner portion 732 within the interior cavity 734a of the outer portion 734. The fusing may comprise sintering. In other embodiments, the fusing process may vary.

Figure 36:
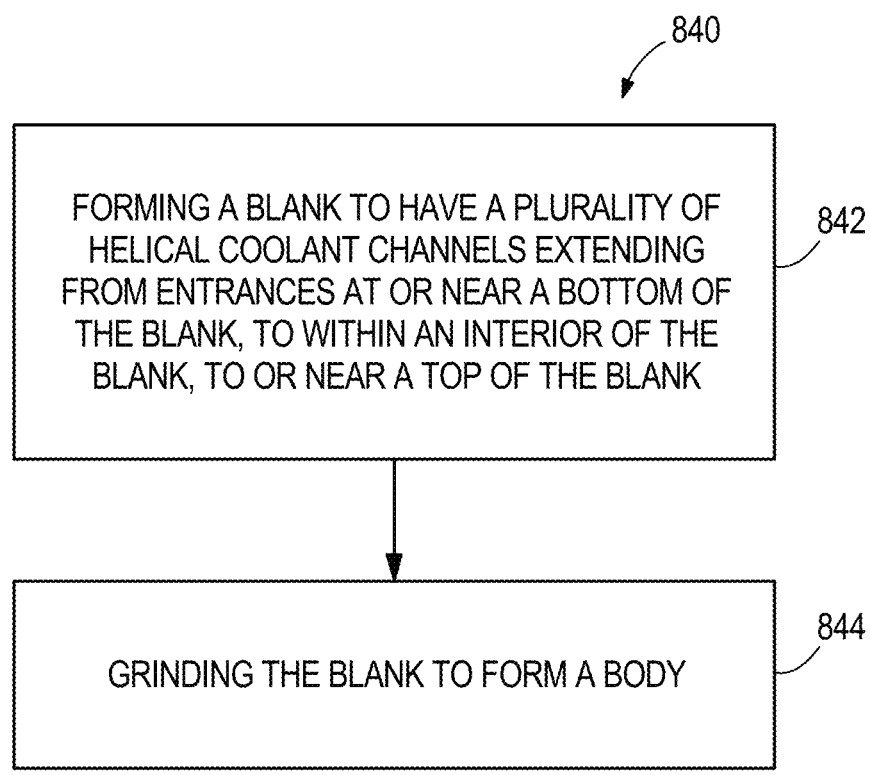
FIG. 36 illustrates one embodiment of a flowchart of a method of manufacturing a cutting tool.

As shown in FIG. 36, one embodiment of a method 840 of manufacturing a cutting tool is disclosed. The method 840 may be followed to manufacture any of the cutting tool embodiments disclosed herein. In other embodiments the method 840 may be followed to manufacture varying cutting tool embodiments.

Step 842 may comprise forming a blank to have a plurality of helical coolant channels extending from entrances at or near a bottom of the blank, to within an interior of the blank, to or near a top of the blank. Step 844 may comprise grinding the blank to form a body.

The body of step 844 may comprise a shank and a tip. The tip may comprise a plurality of spaced-apart, helical flutes. Each of the plurality of spaced-apart, helical flutes may comprise a helical cutting edge extending from a bottom of the tip, adjacent a top of the shank, to a top of the top. The tip further comprise a plurality of chip gash paths. Each of the plurality of chip gash paths may be recessed between two of the respective plurality of spaced-apart, helical flutes, and may extend from the bottom of the tip to a top portion of the tip. The tip may further comprise coolant orifice exits. The plurality of helical coolant channels may extend from the entrances at a bottom of the shank, to within an interior of the shank, to within an interior of the tip, to the coolant orifice exits of the tip. The coolant orifice exits may be disposed in the plurality of spaced-apart, helical flutes adjacent the plurality of chip gash paths or disposed in a plurality of relief surfaces extending from the top of the tip downward to the plurality of chip gash paths. The coolant orifice exits may be spaced-apart from the top of the tip.

In another embodiment of the method 840 of FIG. 36, the method 840 may further comprise manufacturing the cutting tool to comprise an end mill. The end mill may be straight or tapered. In another embodiments, the cutting tool may vary.

In another embodiment of the method 840 of FIG. 36, the step 844 of grinding the blank to form the body may further comprise grinding the blank so that the tip is tapered.

In another embodiment of the method 840 of FIG. 36, the step 842 of forming the blank may comprise extruding the blank to have the plurality of helical coolant channels extending from the entrances at the bottom of the blank, to within the interior of the blank, to or near the top of the blank.

In another embodiment of the method 840 of FIG. 36, the step 842 of forming the blank may comprise: extruding an inner portion to have the plurality of helical coolant channels extending from the entrances at the bottom of the inner portion to or near the top of the inner portion; extruding an outer portion having an interior cavity; inserting the inner portion within the interior cavity of the outer portion; and fusing the inner portion within the interior cavity of the outer portion. The inner and outer portions may be extruded to be cylindrical. The fusing may comprise sintering.

In another embodiment of the method 840 of FIG. 36, the step 842 of forming the blank may further comprise forming the blank so that the plurality of helical coolant channels are circular.

In another embodiment of the method 840 of FIG. 36, the step 842 of forming the blank may further comprise forming the blank so that the plurality of helical coolant channels are non-circular.

In another embodiment of the method 840 of FIG. 36, the step 844 of grinding the blank to form the body may further comprise grinding the blank to form the body having the coolant orifice exits which are circular.

In another embodiment of the method 840 of FIG. 36, the step 844 of grinding the blank to form the body may further comprise grinding the blank to form the body having the coolant orifice exits which are non-circular.

In another embodiment of the method 840 of FIG. 36, the step 844 of grinding the blank to form the body may further comprise grinding the blank to form the body having the coolant orifice exits which comprise slots.

In another embodiment of the method 840 of FIG. 36, the step 844 of grinding the blank to form the body may further comprise grinding the blank to form the body comprising the coolant orifice exits which vary in width along a longitudinal axis with the coolant orifice exits being narrower towards the bottom of the tip and wider towards the top of the tip.

In another embodiment of the method 840 of FIG. 36, the step 844 of grinding the blank to form the body further comprises grinding the blank to form the body comprising the coolant orifices varying along a longitudinal axis with the coolant orifice exits being less exposed towards the bottom of the tip and more exposed towards the top of the tip.

In another embodiment of the method 840 of FIG. 36, the step 844 of grinding the blank to form the body further comprises grinding the blank to form the body comprising the plurality of helical, coolant channels rotating in a same direction (i.e. have a same handedness) as the plurality of spaced-apart, helical flutes.

In another embodiment of the method 840 of FIG. 36, the step 844 of grinding the blank to form the body further comprises grinding the blank to form the body comprising the plurality of helical, coolant channels rotating in a opposite direction as the plurality of spaced-apart, helical flutes.

In another embodiment of the method 840 of FIG. 36, the step 844 of grinding the blank to form the body further comprises grinding the blank to form the body so that the top of the tip comprises a plurality of radially extending cutting edges extending from a center of the tool.

In another embodiment of the method 840 of FIG. 36, the step 844 of grinding the blank to form the body further comprises grinding the blank to form the body so that at least one of the coolant orifice exits is disposed in each of the plurality of spaced-apart, helical flutes.

In another embodiment of the method 840 of FIG. 36, the step 844 of grinding the blank to form the body further comprises grinding the blank to form the body so that the plurality of chip gash paths are disposed below the top of the tip, with the tip further comprising the plurality of relief surfaces extending from the top of the tip downward to the plurality of chip gash paths.

In another embodiment of the method 840 of FIG. 36, the step 844 of grinding the blank to form the body further comprises grinding the blank to form the body so that the coolant orifice exits are disposed in the plurality of spaced-apart, helical flutes adjacent the plurality of chip gash paths.

In another embodiment of the method 840 of FIG. 36, the step 844 of grinding the blank to form the body further comprises grinding the blank to form the body so that the coolant orifice exits are disposed in the plurality of relief surfaces.

In another embodiment of the method 840 of FIG. 36, the step 844 of grinding the blank to form the body further comprises grinding the blank to form the body so that the coolant orifice exits are disposed in both the plurality of spaced-apart, helical flutes adjacent the plurality of chip gash paths, and in the plurality of relief surfaces.

In another embodiment of the method 840 of FIG. 36, the step 844 of grinding the blank to form the body further comprises grinding the blank to form the body so that the coolant orifice exits are disposed in only the plurality of relief surfaces.

In another embodiment of the method 840 of FIG. 36, the step 844 of grinding the blank to form the body further comprises grinding the blank to form the body so that the coolant orifice exits are disposed only in the plurality of spaced-apart, helical flutes adjacent the plurality of chip gash paths.

In another embodiment of the method 840 of FIG. 36, the step 844 of grinding the blank to form the body further comprises grinding the blank to form the body so that some of the coolant orifice exits are disposed only in the plurality of spaced-apart, helical flutes adjacent the plurality of chip gash paths, and some of the coolant orifice exits are disposed in both the plurality of spaced-apart, helical flutes adjacent the plurality of chip gash paths and in the plurality of relief surfaces.

In another embodiment of the method 840 of FIG. 36, the step 842 of forming the blank to have the plurality of helical coolant channels further comprises forming the blank so that some of the plurality of helical coolant channels are disposed closer to a center longitudinal axis extending through the blank than other of the plurality of helical coolant channels.

In still other embodiments, the method 840 of FIG. 36 may vary. For instance, one or more of the steps of the method 840 may be varied in substance or order, one or more additional steps may be added, or one or more steps may not be followed. In still other embodiments, the method 840 of FIG. 36 may further vary.

One or more embodiments of the disclosure may reduce one or more issues associated with one or more of the current cutting tools or their methods of manufacture. The extrusion of a blank to have helical coolant channels, followed by grinding of the blank to expose exits of the helical coolant channels may provide coolant along the entire lengths of helical flutes of the cutting tool to reduce heat and pressure on the cutting tool thereby reducing repair costs. This manufacturing process may be more efficient than current manufacturing processes, and may result in higher quality cutting tools. Moreover, this manufacturing process may be used to produce helical coolant channels which coincide with or are opposite to the direction of the flutes of the cutting tool. This manufacturing process may produce varying shaped coolant profiles including circular, slotted, tear-drop shaped, non-circular shaped, or still other shapes. This manufacturing process may be used to form one or multiple coolant exits per helical flute. This manufacturing process may, by varying the taper of the cutting tool, produce coolant exits forming a single hole, or a slot which travels along the entire length of the helical flutes. By using non-circular, tear-drop shaped coolant exits, the slot width can be varied along the helical flutes by tapering the tip of the cutting tool. By maintaining a small coolant exit towards the bottom of the tip, coolant pressure may be delivered to the top of the tip of the cutting tool. This manufacturing process may deliver coolant along the entire length of the helical flutes of the cutting tool.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

What is claimed is:

1. A method of manufacturing a cutting tool comprising:
   forming a blank to have a plurality of helical coolant channels extending from entrances at or near a bottom of the blank, to within an interior of the blank, to or near a top of the blank; and
   grinding the blank to form a body comprising:
     a shank and a tip;
     wherein the tip comprises a plurality of spaced-apart, helical flutes, each of the plurality of spaced-apart, helical flutes comprising a helical cutting edge extending from a bottom of the tip, adjacent a top of the shank, to a top of the tip;
     wherein the tip further comprises a plurality of chip gash paths, each of the plurality of chip gash paths recessed between two of the respective plurality of spaced-apart, helical flutes, and extending from the bottom of the tip to a top portion of the tip;
     wherein the tip further comprises coolant orifice exits, the plurality of helical coolant channels extending from the entrances at a bottom of the shank, to within an interior of the shank, to within an interior of the tip, to the coolant orifice exits of the tip, the coolant orifice exits disposed in the plurality of spaced-apart, helical flutes adjacent the plurality of chip gash paths or disposed in a plurality of relief surfaces extending from the top of the tip downward to the plurality of chip gash paths, the coolant orifice exits spaced-apart from the top of the tip.

2. The method of claim 1, further comprising following the method to manufacture the cutting tool comprising an end mill.

3. The method of claim 1, wherein the grinding the blank to form the body further comprises grinding the blank so that the tip is tapered.

4. The method of claim 1, wherein the forming the blank comprises extruding the blank to have the plurality of helical coolant channels extending from the entrances at the bottom of the blank, to within the interior of the blank, to or near the top of the blank.

5. The method of claim 1, wherein the forming the blank comprises:
- extruding an inner portion to have the plurality of helical coolant channels extending from the entrances at the bottom of the inner portion to or near the top of the inner portion;
- extruding an outer portion having an interior cavity;
- inserting the inner portion within the interior cavity of the outer portion; and
- fusing the inner portion within the interior cavity of the outer portion.

6. The method of claim 5 wherein the fusing comprises sintering.

7. The method of claim 1, wherein the grinding the blank to form the body further comprises grinding the blank to form the body having the coolant orifice exits which comprise slots.

8. The method of claim 1, wherein the grinding the blank to form the body further comprises grinding the blank to form the body comprising the coolant orifice exits which vary in width along a longitudinal axis with the coolant orifice exits being narrower towards the bottom of the tip and wider towards the top of the tip.

9. The method of claim 1, wherein the grinding the blank to form the body further comprises grinding the blank to form the body comprising the plurality of helical, coolant channels rotating in a same direction as the plurality of spaced-apart, helical flutes.

10. The method of claim 1, wherein the grinding the blank to form the body further comprises grinding the blank to form the body comprising the plurality of helical, coolant channels rotating in a opposite direction as the plurality of spaced-apart, helical flutes.

11. The method of claim 1, wherein the grinding the blank to form the body further comprises grinding the blank to form the body so that the top of the tip comprises a plurality of radially extending cutting edges extending from a center of the tool.

12. The method of claim 1, wherein the grinding the blank to form the body further comprises grinding the blank to form the body so that at least one of the coolant orifice exits is disposed in each of the plurality of spaced-apart, helical flutes.

13. The method of claim 1, wherein the grinding the blank to form the body further comprises grinding the blank to form the body so that the plurality of chip gash paths are disposed below the top of the tip, with the tip further comprising the plurality of relief surfaces extending from the top of the tip downward to the plurality of chip gash paths.

14. The method of claim 13, wherein the grinding the blank to form the body further comprises grinding the blank to form the body so that the coolant orifice exits are disposed in the plurality of spaced-apart, helical flutes adjacent the plurality of chip gash paths.

15. The method of claim 13, wherein the grinding the blank to form the body further comprises grinding the blank to form the body so that the coolant orifice exits are disposed in the plurality of relief surfaces.

16. The method of claim 13, wherein the grinding the blank to form the body further comprises grinding the blank to form the body so that the coolant orifice exits are disposed in both the plurality of spaced-apart, helical flutes adjacent the plurality of chip gash paths, and in the plurality of relief surfaces.

17. The method of claim 13, wherein the grinding the blank to form the body further comprises grinding the blank to form the body so that the coolant orifice exits are disposed in only the plurality of relief surfaces.

18. The method of claim 13, wherein the grinding the blank to form the body further comprises grinding the blank to form the body so that the coolant orifice exits are disposed only in the plurality of spaced-apart, helical flutes adjacent the plurality of chip gash paths.

19. The method of claim 13, wherein the grinding the blank to form the body further comprises grinding the blank to form the body so that some of the coolant orifice exits are disposed only in the plurality of spaced-apart, helical flutes adjacent the plurality of chip gash paths, and some of the coolant orifice exits are disposed in both the plurality of spaced-apart, helical flutes adjacent the plurality of chip gash paths and in the plurality of relief surfaces.

20. The method of claim 19, wherein the forming the blank to have the plurality of helical coolant channels further comprises forming the blank so that some of the plurality of helical coolant channels are disposed closer to a center longitudinal axis extending through the blank than other of the plurality of helical coolant channels.

* * * * *